(12) United States Patent
Inoue

(10) Patent No.: US 12,230,141 B2
(45) Date of Patent: Feb. 18, 2025

(54) WATERCRAFT SHARE-RIDE SYSTEM, A WATERCRAFT SHARE-RIDE METHOD, AND A COMPUTER FOR A WATERCRAFT

(71) Applicant: YAMAHA HATSUDOKI KABUSHIKI KAISHA, Iwata (JP)

(72) Inventor: Hiroshi Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 98 days.

(21) Appl. No.: 17/211,988

(22) Filed: Mar. 25, 2021

(65) Prior Publication Data
US 2021/0312815 A1 Oct. 7, 2021

(30) Foreign Application Priority Data
Apr. 7, 2020 (JP) .................. 2020-069436

(51) Int. Cl.
*B63G 1/00* (2006.01)
*B63B 35/00* (2020.01)
(Continued)

(52) U.S. Cl.
CPC .............. *G08G 3/00* (2013.01); *B63B 35/00* (2013.01); *G01C 21/203* (2013.01); *B63B 2035/004* (2013.01)

(58) Field of Classification Search
CPC .................. G06Q 10/02; G01C 21/203; B60W 60/00253; B63G 1/00; B63B 69/00;
(Continued)

(56) References Cited

U.S. PATENT DOCUMENTS 7,313,471 B2 * 12/2007 Roberts ............... G01M 17/00
701/1
9,045,202 B1 * 6/2015 Alarcon ............... B63B 32/60
(Continued)

FOREIGN PATENT DOCUMENTS

JP         2002157485 A  *  5/2002
JP         5895079 B1    *  3/2016
WO    WO-2015077634 A1  *  5/2015  ....... G06F 17/30864

OTHER PUBLICATIONS

R. Hasan, A. H. Bhatti, M. S. Hayat, H. M. Gebreyohannes, S. I. Ali and A. J. Syed, "Smart peer car pooling system," 2016 3rd MEC International Conference on Big Data and Smart City (ICBDSC), 2016, pp. 1-6, doi: 10.1109/ICBDSC.2016.7460384.: (Year: 2016).*
(Continued)

*Primary Examiner* — Cuong H Nguyen
(74) *Attorney, Agent, or Firm* — Keating & Bennett, LLP

(57) ABSTRACT

A watercraft share-ride system includes a cloud server, an owner terminal, and a user terminal. The owner terminal provides first share-ride condition information of an owner to the cloud server. The user terminal provides second share-ride condition information of a user to the cloud server. The cloud server provides watercraft information of the owner to the user terminal when the first share-ride condition information and the second share-ride condition information match. The cloud server acquires share-ride request information corresponding to the watercraft information when the watercraft information is selected by the user terminal.

21 Claims, 12 Drawing Sheets

(51) Int. Cl.
*G01C 21/20* (2006.01)
*G08G 3/00* (2006.01)

(58) Field of Classification Search
CPC ... B63B 79/00; B63B 35/00; B63B 2035/004;
G08G 3/00; G06F 17/60; G07B 15/02
USPC .................................................. 348/148, 984
See application file for complete search history.

(56) References Cited

U.S. PATENT DOCUMENTS

| | | | | |
|---|---|---|---|---|
| 11,006,479 | B2* | 5/2021 | Pan | H04W 84/02 |
| 11,087,252 | B2* | 8/2021 | DaCosta | G08G 1/123 |
| 11,159,639 | B2* | 10/2021 | Zhuo | H04L 67/60 |
| 11,287,275 | B2* | 3/2022 | Kotake | G01C 21/3605 |
| 11,348,134 | B2* | 5/2022 | Chintakindi | G06Q 30/0239 |
| 11,375,359 | B2* | 6/2022 | Suzuki | H04W 8/18 |
| 11,423,349 | B2* | 8/2022 | Boye | G06Q 10/067 |
| 11,625,957 | B2* | 4/2023 | Gronsbell | G06Q 50/30 |
| | | | | 701/31.4 |
| 2006/0149438 | A1* | 7/2006 | Roberts | G06Q 30/0241 |
| | | | | 701/29.4 |
| 2014/0201034 | A1* | 7/2014 | Heuser | G06Q 30/0625 |
| | | | | 705/26.62 |
| 2016/0292596 | A1* | 10/2016 | Gaitan | G06Q 10/101 |
| 2018/0025392 | A1* | 1/2018 | Helstab | G06Q 10/10 |
| | | | | 705/306 |
| 2019/0043121 | A1* | 2/2019 | Barnes | G06Q 30/08 |
| 2019/0287202 | A1* | 9/2019 | Mitsumaki | G06Q 50/30 |
| 2020/0065932 | A1* | 2/2020 | Nakanishi | G06Q 10/06315 |
| 2020/0272965 | A1* | 8/2020 | Tanabe | G06Q 10/06311 |

OTHER PUBLICATIONS

38 USC 101 rev 2019 Patenability Eligibily guidance flowcharts.*
Remix Primer Series Jun. 7, 2021; Ride-Hailing vs. Ride-Sharing: The Difference Explained (Year: 2021).*

* cited by examiner

WATERCRAFT SHARE-RIDE SYSTEM, A WATERCRAFT SHARE-RIDE METHOD, AND A COMPUTER FOR A WATERCRAFT

CROSS REFERENCE TO RELATED APPLICATIONS

This application claims the benefit of priority to Japanese Patent Application No. 2020-069436 filed on Apr. 7, 2020. The entire contents of this application are hereby incorporated herein by reference.

BACKGROUND OF THE INVENTION

1. Field of the Invention

The present invention relates to a watercraft share-ride system, a watercraft share-ride method, and a computer for a watercraft.

2. Description of the Related Art

In the prior art, a system in which a plurality of watercraft vendors invites a user is disclosed (see Japanese Patent Application Laid-Open No. 2002-157485). In this watercraft system, each of the watercraft vendors manages a plurality of watercrafts. The captain of the watercraft on which the user is on board is prepared by the watercraft vendor.

In the watercraft system described above, the user reserves the watercraft via the watercraft vendors. However, a system for individual owners to invite the user to share a ride on the owner's watercraft has not been established.

SUMMARY OF THE INVENTION

Preferred embodiments of the present invention provide watercraft share-ride systems each of which is able to directly invite a user to share a ride on an owner's watercraft.

Additional preferred embodiments of the present invention provide computers for watercrafts each of which is able to directly invite a user to share a ride on an owner's watercraft. Other preferred embodiments of the present invention provide watercraft share-ride methods each of which is able to directly invite a user to share a ride on an owner's watercraft.

A watercraft share-ride system according to a preferred embodiment of the present invention is used to invite a user to share a ride on an owner's watercraft. The watercraft share-ride system includes a computer, an owner terminal, a user terminal, and a watercraft.

The owner terminal provides first share-ride condition information of an owner to the computer. The user terminal provides second share-ride condition information of the user to the computer. The watercraft includes a communicator to communicate with the computer.

The computer is configured or programmed to provide watercraft information of the owner to the user terminal when the first share-ride condition information and the second share-ride condition information match. The computer is configured or programmed to acquire share-ride request information corresponding to the watercraft information when the watercraft information is selected by the user terminal.

A computer for a watercraft according to another preferred embodiment of the present invention is used to invite a user to share a ride on an owner's watercraft. The computer includes an information receiver, an information provider, and processor circuitry.

The information receiver acquires information from an owner terminal and a user terminal. The information provider provides information to the owner terminal and the user terminal. The processor circuitry is configured or programmed to process the information acquired by the information receiver.

The processor circuitry is configured or programmed to provide the watercraft information of an owner to the user terminal when first share-ride condition information acquired from the owner terminal by the information receiver and second share-ride condition information acquired from the user terminal by the information receiver match.

The processor circuitry is configured or programmed to acquire share-ride request information to request a user's share-ride to the owner when the watercraft information is selected by the user terminal.

A watercraft share-ride method according to a preferred embodiment of the present invention is performed by a computer to invite a user to share a ride on an owner's watercraft. The watercraft share-ride method includes providing watercraft information of an owner to a user terminal when first share-ride condition information acquired from the owner terminal and second share-ride condition information acquired from the user terminal match, and acquiring share-ride request information to request a user's share-ride to the owner when the watercraft information is selected by the user terminal.

According to preferred embodiments of the present invention, it is possible to directly invite a user to share a ride on an owner's watercraft by using the watercraft share-ride system, the computer for a watercraft, and the watercraft share-ride method.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
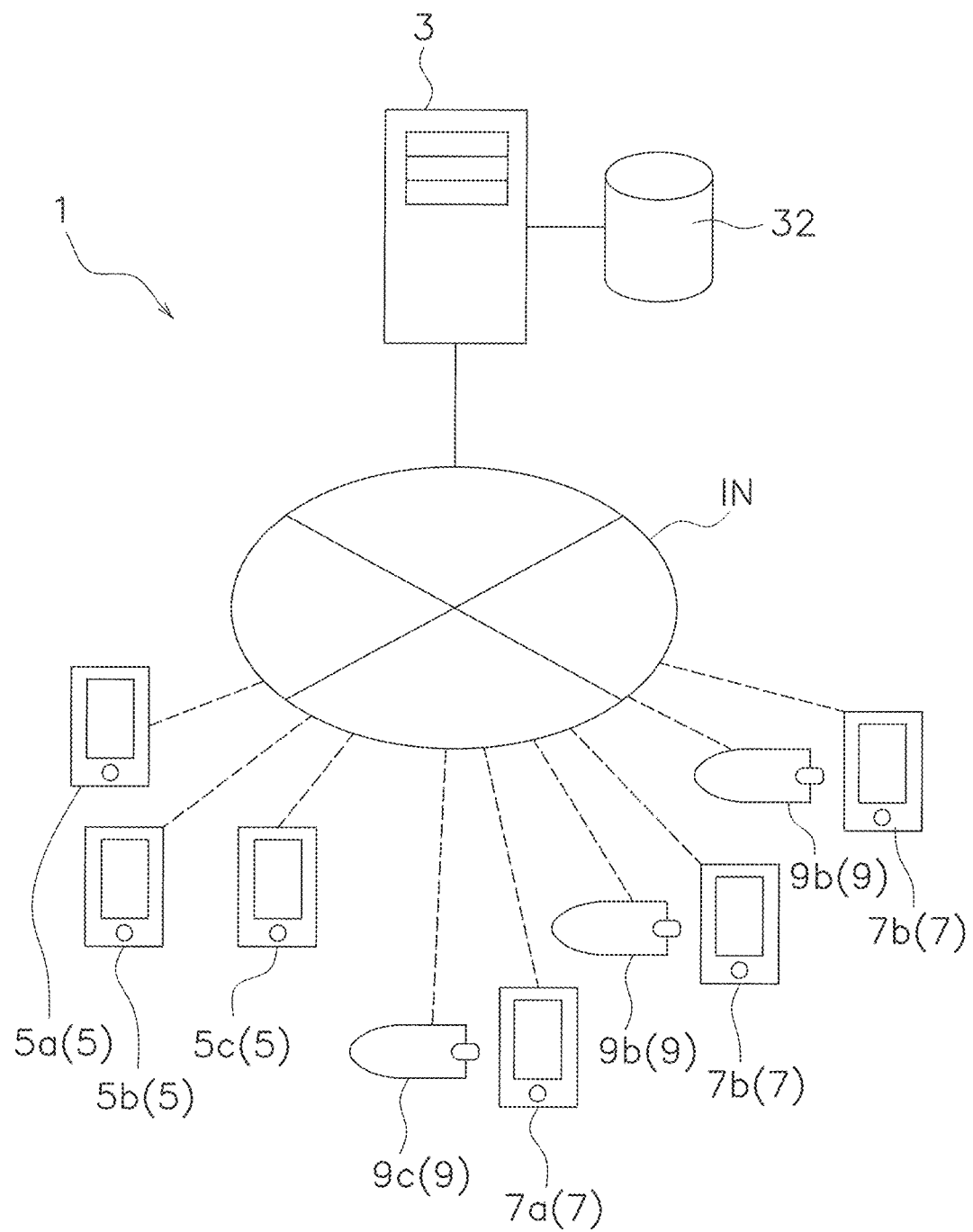
FIG. 1 is a schematic diagram which shows a watercraft share-ride system according to a preferred embodiment of the present invention.

Hereinafter, preferred embodiments of the present invention will be described with reference to the drawings. The watercraft share-ride system 1 is used to invite a user to share a ride on an owner's watercraft. As shown in FIG. 1, the watercraft share-ride system 1 includes a cloud server 3 (an example of at least one computer), at least one owner terminal 5, and at least one user terminal 7.

The cloud server 3 may include one computer or a plurality of computers. In the present preferred embodiment, an example in which the cloud server 3 includes one computer is described.

In the present preferred embodiment, an example in which the watercraft share-ride system 1 includes the cloud server 3, the plurality of owner terminals 5, and the plurality of user terminals 7 is illustrated. In FIG. 1, the reference numerals "5a, 5b, 5c" indicate the plurality of owner terminals 5 respectively, and the reference numerals "7a, 7b, 7c" indicate the plurality of user terminals 7, respectively.

The watercraft share-ride system 1 further includes a communicator 92, a watercraft position detector 93, and a fuel detector 94, which will be described below (see FIG. 2). The communicator 92, the watercraft position detector 93, and the fuel detector 94 are provided on the watercraft 9. In other words, the watercraft sharing system 1 includes the cloud server 3, the owner terminal 5, the user terminal 7, and the watercraft 9.

In FIG. 1, the reference numerals "9a, 9b, 9c" indicate the watercrafts 9 owned by the owners, respectively. The watercrafts 9 may be, but are not limited to, ships, boats, etc., or any other suitable types of marine vessels. The watercraft 9a is owned by the owner of the owner terminal 5a. The watercraft 9b is owned by the owner of the owner terminal 5b. The watercraft 9c is owned by the owner of the owner terminal 5c. Any one of the plurality of watercrafts 9a, 9b, 9c is used as a watercraft for a share-ride.

The cloud server 3, the owner terminal 5 (5a, 5b, 5c), the user terminal 7 (7a, 7b, 7c), and the watercraft 9 (9a, 9b, 9c) are able to communicate with each other via the Internet IN, for example.

The watercraft rental system 1 further includes a maintenance information providing terminal, which transmits maintenance information indicating an end of maintenance of the watercraft 9, to the cloud server 3. In the present preferred embodiment, an example in which the maintenance information providing terminal is the owner terminal 5 is described.

The maintenance information providing terminal may be a third-party terminal other than the user terminal 7 and the owner terminal 5. In this case, for example, the third party terminal is a terminal of a maintenance company that performs the maintenance of the watercraft 9 (9a, 9b, 9c).

The word "information" is used in the following description. The word "information" includes the meaning of "data".

Each of the plurality of owner terminals 5a, 5b, and 5c illustrated in FIG. 1 includes the following configuration. In the following, each owner terminal 5a, 5b, 5c will be described with the word "owner terminal 5".

The owner terminal 5 is a communication terminal which communicates with the cloud server 3. For example, the owner terminal 5 includes a smartphone, a tablet, a desktop personal computer, a notebook personal computer, a wearable terminal, and the like.

Figure 2:
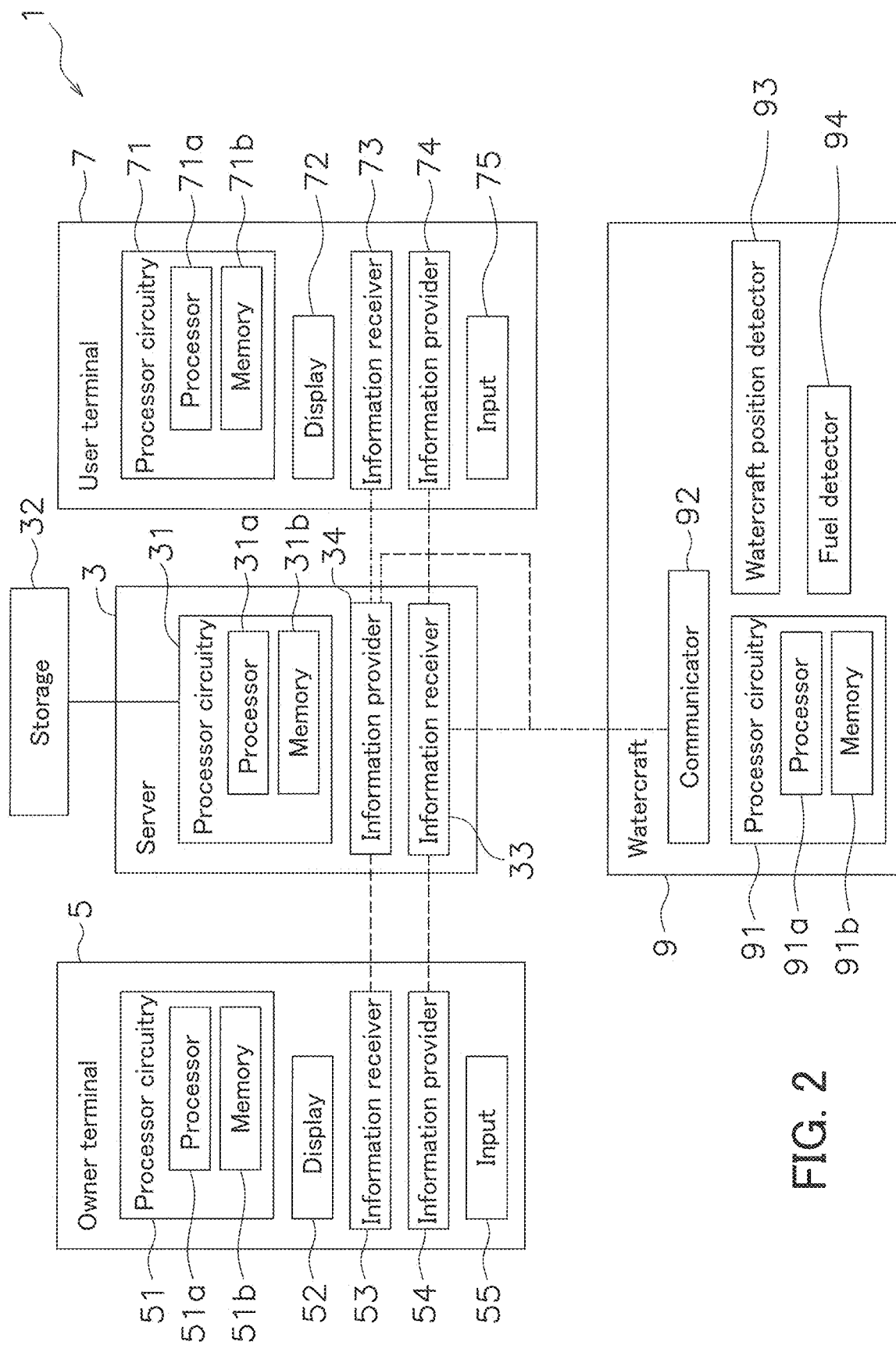
FIG. 2 is a functional block diagram of the watercraft share-ride system.

As shown in FIG. 2, the owner terminal 5 includes processor circuitry 51 of the owner terminal 5, a display 52 of the owner terminal 5, an information receiver 53 of the owner terminal 5, an information provider 54 of the owner terminal 5, and an input 55 of the owner terminal 5.

The processor circuitry 51 of the owner terminal 5 processes various information in the owner terminal 5. The processor circuitry 51 of the owner terminal 5 controls the display 52 of the owner terminal 5, the information receiver 53 of the owner terminal 5, the information provider 54 of the owner terminal 5, and the input 55 of the owner terminal 5.

For example, the processor circuitry 51 of the owner terminal 5 includes a processor 51a and a memory 51b. The processor 51a is, for example, a CPU (Central Processing Unit). The processor 51a processes various information of the owner terminal 5 based on the program recorded in the memory 51b.

The processor 51a controls the display 52 of the owner terminal 5, the information receiver 53 of the owner terminal 5, and the information provider 54 of the owner terminal 5 based on the program recorded in the memory 51b.

The input 55 of the owner terminal 5 accepts an owner's input. The input information and the input signal for the input 55 of the owner terminal 5 are recognized by the processor 51a.

The memory 51b records various information which is processed by the processor 51a and various programs which are executed by the processor 51a. The memory 51b includes a volatile memory such as RAM. The memory 51b includes a non-volatile memory such as a ROM.

The display 52 of the owner terminal 5 displays information. Specifically, the display 52 of the owner terminal 5 displays the information based on the command of the processor 51a of the owner terminal 5.

The information receiver 53 of the owner terminal 5 receives information and signals from the cloud server 3. The information and signals received from the cloud server 3 are recognized by the processor 51a of the owner terminal 5. The information received from the cloud server 3 is recorded in the memory 51b of the owner terminal 5.

The information provider 54 of the owner terminal 5 provides information and signals to the cloud server 3. For example, the information provider 54 of the owner terminal 5 transmits the information and the signals to the cloud server 3 based on the command of the processor 51a of the owner terminal 5. The information provider 54 of the owner terminal 5 transmits the information and the signals to the cloud server 3 when the input 55 of the owner terminal 5 receives a transmission command.

The input 55 of the owner terminal 5 acquires the input information which is input by the owner. The owner's input information is recognized by the processor 51a of the owner terminal 5. The input 55 of the owner terminal 5 may be realized by hardware or software.

For example, the input 55 of the owner terminal 5 may be an input such as a physical button or an input such as a touch panel. When a touch panel or the like is used, it is preferable that the display 52 of the owner terminal 5 is used as the input 55 of the owner terminal 5.

Watercraft information and owner information are input from the input 55 of the owner terminal 5. The watercraft information includes watercraft-body information, engine information, equipment information, and the like. The owner information includes name of the owner and identification information of the owner terminal 5.

The processor 51a of the owner terminal 5 recognizes the watercraft information and the owner information, and records the watercraft information and the owner information in the memory 51b of the owner terminal 5. The processor 51a of the owner terminal 5 issues a command, which is used to provide the watercraft information and the owner information to the server 3, to the information provider 54 of the owner terminal 5. Thus, the watercraft information and the owner information are provided from the owner terminal 5 to the server 3.

The owner terminal 5 including the above configuration acquires the share-ride condition input information to input first share-ride condition information of the owner from the cloud server 3 via the information receiver 53 of the owner terminal 5.

The share-ride condition input information may be pre-recorded in an application used for sharing a ride on the watercraft 9. In this case, the owner terminal 5 may acquire the share-ride condition input information when the application used for sharing a ride on the watercraft 9 is downloaded from the cloud server 3. The owner terminal 5 may acquire the share-ride condition input information when the application used for sharing a ride on the watercraft 9 is downloaded from a server different from the cloud server 3 (for example, a server for application).

The share-ride condition input information includes item information to input date-time information for sharing a ride on the watercraft 9, first purpose information indicating a navigation purpose of the owner, route information indicating a route on which the owner navigates, and the like.

The date-time information indicates date information of the share-ride on the watercraft 9, start time information to start the share-ride on the watercraft 9, end time information to end the share-ride on the watercraft 9, and the like. The navigation purpose indicates fishing, cruising, and the like. The route information indicates a departure point, a destination, a route, and the like.

The share-ride condition input information is displayed on the display 52 of the owner terminal 5. For example, the processor 51a of the owner terminal 5 displays the item information to input the date-time information, the first purpose information, the route information, and the like, on the display 52 of the owner terminal 5.

The owner terminal 5 generates the first share-ride condition information by using the processor 51a of the owner terminal 5. The first share-ride condition information is provided to the user when each of the plurality of owners invites the user to share a ride on the watercraft 9. For example, the first share-ride condition information is generated by inputting the share-ride condition corresponding to the share-ride condition input information.

For example, when the date-time information, the first purpose information, the route information, and the like are input as the item information via the input 55 of the owner terminal 5, the first share-ride condition information is generated.

Specifically, the date-time information, the first purpose information, the route information, and the like are recognized by the processor 51a of the owner terminal 5 by inputting the date-time information, the first purpose information, the route information, and the like on the input 55 of the owner terminal 5.

The processor 51a of the owner terminal 5 records the date-time information, the first purpose information, the route information, and the like in the memory 51b of the owner terminal 5 as the first share-ride condition information.

The owner terminal 5 displays the first share-ride condition information on the display 52 of the owner terminal 5. For example, the processor 51a of the owner terminal 5 reads the first share-ride condition information from the memory 51b of the owner terminal 5, and displays the first share-ride condition information on the display 52 of the owner terminal 5.

The owner terminal 5 provides the first share-ride condition information to the cloud server 3 via the information provider 54 of the owner terminal 5. For example, when the input 55 of the owner terminal 5 receives a transmission instruction, the processor 51a of the owner terminal 5 transmits the first share-ride condition information from the information provider 54 of the owner terminal 5 to the cloud server 3.

The owner terminal 5 provides the cloud server 3 with the maintenance information indicating the end of maintenance of the watercraft 9. The maintenance information indicates the end of maintenance of the watercraft 9, such as fuel calibration and confirmation of fuel replenishment status.

The owner terminal 5 acquires the answer input information from the cloud server 3 via the information receiver 53 of the owner terminal 5. The answer input information is provided from the cloud server 3 to the owner terminal 5 when the user requests the owner to share a ride on the watercraft 9.

The answer input information may be pre-recorded in an application used for sharing a ride of watercraft 9. In this case, the owner terminal 5 may acquire the answer input information when the application used for sharing a ride on the watercraft 9 is downloaded from the cloud server 3. The owner terminal 5 may acquire answer input information when the application used for sharing a ride on the watercraft 9 is downloaded from a server different from the cloud server 3 (for example, a server for an application).

The answer input information includes item information to input permission information to permit the share-ride on the watercraft 9 and item information to input refusal information and the like to refuse the share-ride on the watercraft 9. The answer input information is displayed on the display 52 of the owner terminal 5.

The answer input information includes a pull-down menu in which permission items and refusal items are able to be directly selected respectively. It may include a check box in which the permission items and the refusal items are able to be selected respectively. It may include an input box to directly input character information of the permission items and the refusal items.

In the owner terminal 5, the answer information is input to the answer input information. For example, when the permission item or the refusal item is selected, the processor 51a of the owner terminal 5 recognizes the permission information corresponding to the permission item or the refusal information corresponding to the refusal item as an answer information. The processor 51a of the owner terminal 5 records the answer information in the memory 51b of the owner terminal 5. The answer information includes permission information or refusal information.

The owner terminal 5 displays the answer information on the display 52 of the owner terminal 5. For example, the processor 51a of the owner terminal 5 reads the answer information from the memory 51b of the owner terminal 5, and displays the answer information on the display 52 of the owner terminal 5.

The owner terminal 5 provides the answer information to the cloud server 3. For example, the processor 51*a* of the owner terminal 5 transmits the answer information to the cloud server 3 via the information provider 54 of the owner terminal 5. Specifically, when the input 55 of the owner terminal 5 receives the transmission instruction, the processor 51*a* of the owner terminal 5 transmits the answer information to the cloud server 3 via the information provider 54 of the owner terminal 5.

The owner terminal 5 acquires contract information from the cloud server 3. For example, the owner terminal 5 acquires the contract information from the cloud server 3 via the information receiver 53 of the owner terminal 5. The contract information includes the content indicating establishment or non-establishment of the contract and the first share-ride condition information.

The owner terminal 5 acquires navigation distance information and fuel consumption information from the cloud server 3. For example, the owner terminal 5 acquires the navigation distance information and the fuel consumption information from the cloud server 3 via the information receiver 53 of the owner terminal 5. The navigation distance information indicates the distance that the watercraft 9, which the owner shares a ride with the user, navigates. The fuel consumption information indicates the fuel that the watercraft 9, which the owner shares a ride with the user, consumes during navigation.

The owner terminal 5 acquires the fuel consumption information and the navigation distance information from the cloud server 3 via the information receiver 53 of the owner terminal 5. The owner terminal 5 displays the fuel consumption information and the navigation distance information on the display 52 of the owner terminal 5.

The owner terminal 5 provides the cloud server 3 with evaluation information of the user indicating the user's evaluation. For example, the owner terminal 5 transmits the evaluation information to the cloud server 3 via the information provider 54 of the owner terminal 5. Specifically, when the input 55 of the owner terminal 5 receives the transmission instruction, the processor 51*a* of the owner terminal 5 transmits the evaluation information to the cloud server 3 via the information provider 54 of the owner terminal 5.

Each of the plurality of user terminals 7*a*, 7*b*, 7*c* illustrated in FIG. 1 includes the following configuration. In the following, each user terminal 7*a*, 7*b*, 7*c* will be described with the word "user terminal 7".

The user terminal 7 is a communication terminal which communicates with the cloud server 3. For example, the user terminal 7 includes a smartphone, a tablet, a desktop personal computer, a notebook personal computer, a wearable terminal, and the like.

As shown in FIG. 2, the user terminal 7 includes processor circuitry 71 of the user terminal 7, a display 72 of the user terminal 7, an information receiver 73 of the user terminal 7, an information provider 74 of the user terminal 7, and an input 75 of the user terminal 7.

The processor circuitry 71 of the user terminal 7 processes various information in the user terminal 7. The processor circuitry 71 of the user terminal 7 controls the display 72 of the user terminal 7, the information receiver 73 of the user terminal 7, and the information provider 74 of the user terminal 7.

For example, the processor circuitry 71 of the user terminal 7 includes a processor 71*a* and a memory 71*b*. The processor 71*a* is, for example, a CPU. The processor 71*a* processes various information of the user terminal 7 based on the program recorded in the memory 71*b*. The processor 71*a* controls the display 72 of the user terminal 7, the information receiver 73 of the user terminal 7, and the information provider 74 of the user terminal 7 based on the program recorded in the memory 71*b*.

The input 75 of the user terminal 7 accepts a user's input. The input information and the input signal for the input 75 of the user terminal 7 are recognized by the processor 71*a*.

The memory 71*b* records various information processed by the processor 71*a* and various programs which are executed by the processor 71*a*. The memory 71*b* includes a volatile memory such as RAM. The memory 71*b* includes a non-volatile memory such as a ROM.

The display 72 of the user terminal 7 displays information. Specifically, the display 72 of the user terminal 7 displays the information based on the command of the processor 71*a* of the user terminal 7.

The information receiver 73 of the user terminal 7 acquires information and signals from the cloud server 3. The information and signals acquired from the cloud server 3 are recognized by the processor 71*a* of the user terminal 7. The information received from the cloud server 3 is recorded in the memory 71*b* of the user terminal 7.

The information provider 74 of the user terminal 7 provides information and signals to the cloud server 3. For example, the information provider 74 of the user terminal 7 transmits the information and the signals to the cloud server 3 based on the command of the processor 71*a* of the user terminal 7.

For example, when the input 75 of the user terminal 7 receives the transmission instruction, the processor 71*a* of the user terminal 7 transmits the information and the signals from the information provider 74 of the user terminal 7 to the cloud server 3.

The input 75 of the user terminal 7 acquires the user's input. The input 75 of the user terminal 7 may be realized by hardware or software. For example, the input 75 of the user terminal 7 may be an input such as a physical button or an input such as a touch panel. When a touch panel or the like is used, it is preferable that the display 72 of the user terminal 7 is used as the input 75 of the user terminal 7.

The user terminal 7 including the above configuration acquires various information via the information receiver 73 of the user terminal 7. The user terminal 7 provides various types of information via the information provider 74 of the user terminal 7.

For example, the user terminal 7 acquires a plurality of first share-ride condition information from the cloud server 3 via the information receiver 73 of the user terminal 7. The user terminal 7 acquires a share-ride list from the cloud server 3 via the information receiver 73 of the user terminal 7. The share-ride list includes the watercraft information and the owner information.

The processor 71*a* of the user terminal 7 displays the plurality of first share-ride condition information and the share-ride list on the display 72 of the user terminal 7. For example, the share-ride list includes the plurality of watercraft information on which the user is sharing a ride and/or the plurality of owner information on which the user can request the share-ride.

The share-ride list includes a check box in which the plurality of watercraft information and/or the plurality of owner information are able to be selected respectively.

The share-ride list may include an input box to directly input the plurality of watercraft information and/or the plurality of owner information by characters, symbols, or the like. The share-ride list may include a pull-down menu in which the plurality of watercraft information and/or the plurality of owner information are able to be directly selected respectively.

The user terminal 7 generates second share-ride condition information of the user by using the processor 71*a* of the user terminal 7. The second share-ride condition information is used to request the user's share-ride with respect to the owner's watercraft 9. For example, the second share-ride condition information of the user is generated by inputting the second share-ride condition information on the share-ride list.

For example, the second share-ride condition information is generated, when the watercraft information and/or the owner information, on which the user requests the share-ride in the share-ride list, is selected in the input 75 of the user terminal 7.

Specifically, the watercraft information and the owner information, on which the user requests the share-ride, are recognized by the processor 71*a* of the user terminal 7, by selecting the watercraft information and/or the owner information on the input 75 of the user terminal 7. The processor 71*a* of the user terminal 7 records the watercraft information and the owner information in the memory 71*b* of the user terminal 7 as the second share-ride condition information.

The processor 71*a* of the user terminal 7 displays item information, on which the user's desired share-ride date-time information for the owner that the user requests the share-ride is input, on the display 72 of the user terminal, based on the watercraft information and the owner information.

When the user's desired share-ride date-time information is input to the above item information via the input 75 of the user terminal 7, the processor 71*a* of the user terminal 7 recognizes the user information, the watercraft information, the owner information, and the user's desired share-ride date-time information as the second share-ride condition information.

In other words, the processor 71*a* of the user terminal 7 generates the second share-ride condition information which includes the user information, the watercraft information, the owner information, and the user's desired share-ride date-time information. The processor 71*a* of the user terminal 7 records the second share-ride condition information in the memory 71*b* of the user terminal 7.

The user terminal 7 displays the second share-ride condition information on the display 72 of the user terminal 7. For example, the processor 71*a* of the user terminal 7 reads the second share-ride condition information (the user information, the watercraft information, the owner information, and the user's desired share-ride date-time information) from the memory 71*b* of the user terminal 7.

The processor 71*a* of the user terminal 7 displays the user's desired share-ride date-time information on the display 72 of the user terminal 7. The user's desired share-ride date-time information includes user's desired share-ride date information and user's desired share-ride time information.

The user terminal 7 provides the second share-ride condition information to the cloud server 3 via the information provider 74 of the user terminal 7. For example, the processor 71*a* of the user terminal 7 issues a transmission command, which is used to transmit the second share-ride condition information to the cloud server 3, to the information provider 74 of the user terminal 7. Specifically, when the input 75 of the user terminal 7 receives a transmission instruction, the processor 71*a* of the user terminal 7 issues the above transmission command to the information provider 74 of the user terminal 7.

The user terminal 7 acquires the watercraft information of the owner via the information receiver 73 of the user terminal 7. For example, the user terminal 7 records the watercraft information of the plurality of owners in the memory 71*b* of the user terminal 7. The user terminal 7 reads the watercraft information of the plurality of owners from the memory 71*b* of the user terminal 7 and displays it on the display 72 of the user terminal 7.

The user terminal 7 provides share-ride request information to the cloud server by selecting the watercraft information of the owner. The share ride request information is used to request the share-ride of the owner terminal 5. For example, the share-ride request information requests sharing the share-ride of the owner terminal 5, which includes the watercraft information and/or owner information selected by the user terminal 7.

For example, when the user's desired watercraft information is selected from the watercraft information of the plurality of owners, the user terminal 7 transmits the share-ride request information to the cloud server via the information provider 74 of the user terminal 7. Specifically, when a certain watercraft information and/or a certain owner information is selected on the input 75 of the user terminal 7, the processor 71*a* of the user terminal 7 issues a transmission command, which is used to transmit the share-ride request information to the cloud server, to the information provider 74 of the user terminal 7.

The user terminal 7 acquires the answer information from the cloud server 3 via the information receiver 73 of the user terminal 7. The user terminal 7 acquires the contract information from the cloud server 3 via the information receiver 73 of the user terminal 7.

The user terminal 7 records the answer information and the contract information in the memory 71*b* of the user terminal 7. The user terminal 7 reads the answer information and the contract information from the memory 71*b* of the user terminal 7 and displays them on the display 72 of the user terminal 7.

The user terminal 7 provides confirmation information to the cloud server 3 via the information provider 74 of the user terminal 7. The confirmation information is information indicating the user's confirmation of the answer information (the owner's permission information or the owner's refusal information).

For example, when a predetermined input is executed on the input 75 of the user terminal 7, the processor 71*a* of the user terminal 7 recognizes the confirmation information. The processor 71*a* of the user terminal 7 issues a transmission command, which is used to transmit the confirmation information to the cloud server 3, to the information provider 74 of the user terminal 7. Thus, the confirmation signal corresponding to the confirmation information is transmitted from the information provider 74 of the user terminal 7 to the cloud server 3.

The user terminal 7 acquires the navigation distance information and the fuel consumption information from the cloud server 3 via the information receiver 73 of the user terminal 7. The user terminal 7 records the navigation distance information and the fuel consumption information in the memory 71*b* of the user terminal 7. The user terminal 7 reads the navigation distance information and the fuel consumption information from the memory 71*b* of the user terminal 7 and displays them on the display 72 of the user terminal 7.

Each of the plurality of watercrafts 9*a*, 9*b*, 9*c* illustrated in FIG. 1 includes the following configuration. In the following, each watercraft 9*a*, 9*b*, 9*c* will be described with the word "watercraft 9". As shown in FIG. 2, the watercraft 9 includes processor circuitry 91, the communicator 92, the watercraft position detector 93, and the fuel detector 94.

The processor circuitry 91 for the watercraft is provided on the watercraft 9. The processor circuitry 91 of the watercraft processes various information on the watercraft 9. The processor circuitry 91 of the watercraft controls a communicator 92, a watercraft position detector 93, and a fuel detector 94.

For example, the processor circuitry 91 of the watercraft 9 includes a processor 91a and a memory 91b. The processor 91a is, for example, a CPU. The processor 91a processes various information of the watercraft 9 according to the program recorded in the memory 91b. The processor 91a controls the communicator 92, the watercraft position detector 93, and the fuel detector 94 according to the program recorded in the memory 91b.

The memory 91b records various information processed by the processor 91a and various programs executed by the processor 91a. The memory 91b includes a volatile memory such as RAM. The memory 91b includes a non-volatile memory such as a ROM.

The communicator 92 is provided on the watercraft 9. The communicator 92 provides the cloud server 3 with information and signals regarding the watercraft 9. The communicator 92 acquires information and signals regarding the watercraft 9 from the cloud server 3.

For example, the communicator 92 transmits the signal regarding the watercraft 9 to the cloud server 3 based on the command of the processor 91a of the watercraft 9. Specifically, the communicator 92 transmits the signal corresponding to the watercraft position information (described below) to the cloud server 3. Thus, the information of the watercraft 9 is recognized by a processor 31a of the server 3 (described below). The information of the watercraft 9 is recorded in a memory 31b of the server 3 (described below).

The watercraft position detector 93 is provided on the watercraft 9. The watercraft position detector 93 detects the watercraft position information of the watercraft 9. The watercraft position detector 93 is, for example, a GPS receiver (a receiver of the Global Positioning System). The watercraft position detector 93 acquires the watercraft position information from GPS satellites.

The watercraft position information acquired by the watercraft position detector 93 is transmitted from the communicator 92 to the cloud server 3. Specifically, the processor 91a of the watercraft 9 issues a transmission command, which is used to transmit the watercraft position information to the cloud server 3, to the communicator 92.

The fuel detector 94 detects an amount of fuel injected from the engine during the navigation of the watercraft 9. For example, the fuel detector 94 is a sensor that detects the fuel injection amount. The fuel detector 94 is provided on the watercraft 9. The fuel injection amount is monitored by the processor 91a of the watercraft 9. The fuel injection amount is recorded in the memory 91b of the watercraft 9 as the fuel consumption information.

The signal corresponding to the fuel consumption information is transmitted from the communicator 92 to the cloud server 3. Specifically, the processor 91a of the watercraft 9 issues a transmission command, which is used transmit a signal corresponding to the fuel consumption information to the cloud server 3, to the communicator 92.

The cloud server 3 is used to invite the user to share a ride on the watercraft 9 of the owner. As shown in FIG. 2, the cloud server 3 includes processor circuitry 31, a storage 32, an information receiver 33, and an information provider 34. The cloud server 3 may include an input (not illustrated) of the server 3.

The processor circuitry 31 of the server 3 processes various information in the cloud server 3. The processor circuitry 31 of the server 3 processes the information received by the information receiver 33. For example, the processor circuitry 31 of the server 3 processes the information acquired from the owner terminal 5 and the information acquired from the user terminal 7. The processor circuitry 31 of the server 3 controls the information receiver 33 of the server 3 and the information provider 34 of the server 3.

For example, the processor circuitry 31 of the server 3 includes the processor 31a and the memory 31b. The processor 31a is, for example, a CPU. The processor 31a processes various information according to the program recorded in the memory 31b. The processor 31a controls the information receiver 33 of the server 3 and the information provider 34 of the server 3 according to the program recorded in the memory 31b.

When the cloud server 3 includes an input (not illustrated), the input of the server 3 accepts the input of a server administrator. The input information and the input signal of the input of the server 3 are recognized by the processor 31a.

The memory 31b records various information processed by the processor 31a and various programs executed by the processor 31a. The memory 31b includes a volatile memory such as RAM. The memory 31b includes a non-volatile memory such as a ROM.

The storage 32 of the server 3 records the above various information and various programs. The storage 32 of the server 3 includes a storage such as a hard disk and/or SSD. The storage 32 of the server 3 is connected to the processor circuitry 31 of the server 3. The storage 32 of the server 3 may be included in the processor circuitry 31 of the server 3.

For example, the storage 32 of the server 3 is used as a database. The storage 32 of the server 3 may be used as an auxiliary storage for the processor circuitry 31 of the server 3, or may be used as an external storage for the processor circuitry 31 of the server 3.

In the following description, the expressions of "the processor 31a of the server 3 records various information in the memory" and "the processor 31a of the server 3 reads various information from the memory" are used. These expressions may interpret "the memory" as "the storage".

The information receiver 33 of the server 3 acquires information and signals from the owner terminal 5, the user terminal 7, and the watercraft 3. For example, the information receiver 33 of the server 3 receives information and signals from the owner terminal 5, the user terminal 7, and the watercraft 3. The information and signals acquired from the owner terminal 5, the user terminal 7, and the watercraft 3 are recognized by the processor 31a of the server 3. The information acquired from the owner terminal 5, the user terminal 7, and the watercraft 3 is recorded in the memory 31b of the server 3.

The information receiver 33 of the server 3 acquires information and signals from the owner terminal 5, the user terminal 7, and the watercraft 9. For example, the information receiver 33 of the server 3 receives the information and the signals from the owner terminal 5, the user terminal 7, and the watercraft 9.

The information and signals acquired from the owner terminal 5, the user terminal 7, and the watercraft 9 are recognized by the processor 31a of the server 3. The information acquired from the owner terminal 5, the user terminal 7, and the watercraft 9 is recorded in the memory 31b of the server 3.

For example, the information receiver 33 of the server 3 acquires the watercraft position information, which is detected by the watercraft position detector 93 of the watercraft 9, from the communicator 92 of the watercraft 9. The watercraft position information is recorded in the memory 31b of the server 3.

The information receiver 33 of the server 3 acquires a signal corresponding to the fuel consumption information from the communicator 92. This signal is recognized by the processor 31a of the server 3. The fuel consumption information corresponding to this signal is recorded in the memory 31b of the server 3.

The information receiver 33 of the server 3 acquires the maintenance information of the watercraft 9 from the owner terminal 5 (an example of the maintenance information providing terminal). The maintenance information is recognized by the processor 31a of the server 3. The maintenance information is recorded in the memory 31b of the server 3.

The information receiver 33 of the server 3 acquires the second share-ride condition information and the confirmation information from the user terminal 7. The information receiver 33 of the server 3 acquires the answer information from the owner terminal 5.

The second share-ride condition information, the confirmation information, and the answer information are recognized by the processor 31a of the server 3. The second share-ride condition information, the confirmation information, and the answer information are recorded in the memory 31b of the server 3.

The information receiver 33 of the server 3 acquires information request signal, navigation start signal, and navigation end signal from the user terminal 7. The information request signal, the navigation start signal, and the navigation end signal are recognized by the processor 31a of the server 3.

The information provider 34 of the server 3 provides the above information and signals to the owner terminal 5, the user terminal 7, and the watercraft 3. The information provider 34 of the server 3 transmits the information and signals to the owner terminal 5, the user terminal 7, and the watercraft 3.

For example, the processor 31a of the server 3 reads information, which is transmitted to the owner terminal 5, the user terminal 7, and the watercraft 3, from the memory 31b of the server 3.

The processor 31a of the server 3 issues a command, which is used to transmit the information and the signals to the owner terminal 5, the user terminal 7, and the watercraft 9, to the information provider 34 of the server 3, after the processor 31a of the server 3 executes an encryption process for the information and the signals.

The processor circuitry 31 of the server 3 recognizes the first share-ride condition information that the information receiver 33 of the server 3 acquires from the information provider 54 of the owner terminal 5. For example, the processor 31a of the server 3 recognizes the first share-ride condition information. The processor 31a of the server 3 records the first share-ride condition information in the memory 31b of the server 3.

The processor circuitry 31 of the server 3 generates the share-ride list based on the first share-ride condition information. For example, the processor 31a of the server 3 reads the first share-ride condition information of at least one owner from the memory 31b of the server 3. The processor 31a of the server 3 generates the share-ride list based on the first share-ride condition information of at least one owner.

The processor 31a of the server 3 records the share-ride list in the memory 31b of the server 3. In the present preferred embodiment, an example is shown in which the first share-ride condition information of at least one owner is the first share-ride condition information of a plurality of owners.

The processor circuitry 31 of the server 3 provides the user terminal 7 with a plurality of first share-ride condition information and the share-ride list. For example, the processor circuitry 31 of the server 3 transmits the plurality of first share-ride condition information and the share-ride list to the user terminal 7 when the maintenance information is acquired from the owner terminal 5.

Specifically, when the information receiver 33 of the server 3 acquires the maintenance information from the information provider 54 of the owner terminal 5, the processor 31a of the server 3 records the maintenance information in the memory 31b of the server 3. After that, the processor 31a of the server 3 issues a transmission command, which is used to transmit the plurality of first share-ride condition information and the share-ride list to the user terminal 7, to the information provider 34 of the server 3.

The processor circuitry 31 of the server 3 recognizes the second share-ride condition information that the information receiver 33 of the server 3 acquires from the information provider 74 of the user terminal 7.

For example, the processor 31a of the server 3 recognizes the second share-ride condition information. The processor 31a of the server 3 records the second share-ride condition information in the memory 31b of the server 3.

As described above, the second share-ride condition information includes the user information, the watercraft information, the owner information, and the user's desired share-ride date-time information.

The processor circuitry 31 of the server 3 determines whether or not the first share-ride condition information and the second share-ride condition information match. For example, the processor 31a of the server 3 determines whether or not the first share-ride condition information and the second share-ride condition information match.

When the first share-ride condition information and the second share-ride condition information match, the processor 31a of the server 3 issues a transmission command, which is used to transmit the watercraft information of the owner to the user terminal 7, to the server information provider 34.

The processor circuitry 31 of the server 3 recognizes the share-ride request information acquired from the information provider 74 of the user terminal 7. For example, the processor 31a of the server 3 recognizes the share-ride request information. The processor 31a of the server 3 records the share-ride request information in the memory 31b of the server 3.

The processor circuitry 31 of the server 3 provides the owner terminal 5 with the answer input information which is used to cause the owner to input the answer of the share-ride request information.

For example, the processor 31a of the server 3 reads the item information corresponding to the permission item and the item information corresponding to the refusal item, from the memory 31b of the server 3. The processor 31a of the server 3 issues a transmission command, which is used to transmit the item information to the owner terminal 5, to the information provider 34 of the server 3.

The processor circuitry 31 of the server 3 acquires the answer information that the information receiver 33 of the server 3 acquires from the information provider 54 of the owner terminal 5.

For example, the processor 31a of the server 3 recognizes the answer information. The processor 31a of the server 3 records the answer information in the memory 31b of the server 3. As mentioned above, the answer information includes the permission information or the refusal information.

The processor circuitry 31 of the server 3 provides the answer information to the user terminal 7. For example, the processor 31a of the server 3 reads the answer information from the memory 31b of the server 3. The processor 31a of the server 3 issues a transmission command, which is used to transmit the answer information to the user terminal 7, to the information provider 34 of the server 3.

The processor circuitry 31 of the server 3 acquires the confirmation information that the information receiver 33 acquires from the information provider 74 of the user terminal 7. For example, the processor 31a of the server 3 recognizes the confirmation information. The processor 31a of the server 3 records the confirmation information in the memory 31b of the server 3.

The processor circuitry 31 of the server 3 provides the owner terminal 5 and the user terminal 7 with the contract information indicating the establishment or the non-establishment of the contract between the user and the owner.

For example, when the information receiver 33 of the server 3 acquires the confirmation information, the processor 31a of the server 3 generates the contract information based on the second share-ride condition information (the user information, the user's desired share-ride date-time information, and the watercraft information) and the answer information (the permission information or the refusal information).

The processor 31a of the server 3 records the contract information in the memory 31b of the server 3. The processor 31a of the server 3 issues a transmission command, which is used to transmit the contract information to the owner terminal 5 and the user terminal 7, to the information provider 34 of the server 3.

The contract information includes the user information, the user's desired share-ride date-time information, the watercraft information, and the permission information or the refusal information. The user recognizes the contract information regarding the share-ride based on the contract information. The owner recognizes the contract information regarding the share-ride based on the contract information.

The processor circuitry 31 of the server 3 acquires the fuel consumption information from the watercraft 9. The fuel consumption information includes time-series data of the fuel consumption information. For example, the processor 31a of the server 3 recognizes the fuel consumption information of the watercraft 9. The processor 31a of the server 3 records the fuel consumption information of the watercraft 9 in the memory 31b of the server 3.

The processor circuitry 31 of the server 3 calculates fuel cost information based on the fuel consumption information. For example, the processor 31a of the server 3 calculates the fuel cost information based on the fuel consumption information that the server information receiver 33 acquires from the communicator 92 of the watercraft 9.

The processor circuitry 31 of the server 3 provides the fuel cost information to the user terminal 7 and the owner terminal 5. For example, the processor 31a of the server 3 issues a command, which is used to transmit the fuel cost information to the user terminal 7 and the owner terminal 5, to the information provider 34 of the server 3. Thus, the fuel cost information is displayed on the user terminal 7 and the owner terminal 5.

The processor circuitry 31 of the server 3 calculates the navigation distance of the watercraft 9 based on the watercraft position information acquired by the watercraft position detector 93. For example, the processor 31a of the server 3 calculates the navigation distance of the watercraft 9 based on the watercraft position information that the information acquirer 33 of the server 3 receives from the communicator 92 of the watercraft 9.

The navigation distance of the watercraft 9 may be calculated as follows. The processor circuitry 31 of the server 3 calculates the navigation distance of the watercraft 9 based on the fuel consumption information. For example, the processor 31a of the server 3 calculates the navigation distance of the watercraft 9 based on the fuel consumption information that the information acquirer 33 of the server 3 receives from the communicator 92 of the watercraft 9.

The processor circuitry 31 of the server 3 provides the navigation distance information to the user terminal 7 and the owner terminal 5. For example, the processor 31a of the server 3 issues a command, which is used to transmit the navigation distance information to the user terminal 7 and the owner terminal 5, to the information provider 34 of the server 3. Thus, the navigation distance information is displayed on the user terminal 7 and the owner terminal 5.

The processor circuitry 31 of the server 3 transmits the fuel consumption information to the user terminal 7 and the owner terminal 5. For example, the processor 31a of the server 3 issues a command, which is used to transmit the fuel consumption information to the user terminal 7 and the owner terminal 5, to the information provider 34 of the server 3.

Thus, the fuel consumption information is displayed on the user terminal 7 and the owner terminal 5. The user and the owner are able to easily understand the fuel consumption information.

At this time, the fuel cost corresponding to the fuel consumption information may be displayed on the user terminal 7 and the owner terminal 5. In this case, the fuel cost is calculated by the processor circuitry 31 of the server 3 based on rate information and the fuel consumption information acquired by the processor circuitry 31 of the server 3. The rate information may be directly input by the administrator of the server 3 or may be acquired from another server or the like.

In addition, the engine usage status is based on engine usage status information such as engine operating time, engine speed during operation (for example, average rotation speed), and engine usage horsepower during operation (average horsepower). The charge according to the above may be displayed on the user terminal 7 and the owner terminal 5. In this case, the charge is calculated by the processor circuitry 31 of the server 3 based on the table data showing the correspondence between the charge and the engine usage status information.

In addition, the charge according to engine usage status may be displayed on the user terminal 7 and the owner terminal 5, based on engine usage status information such as engine operating time, engine speed during operation (for example, average rotation speed), and engine usage horsepower during operation (average horsepower).

In this case, the charge is calculated by the processor circuitry 31 of the server 3 based on a table data showing a relationship between the charge and the engine usage status information.

The processing mode of the watercraft share-ride system 1 including the above configuration will be described with reference to the flowcharts in FIGS. 3A to 6D.

Figure 3A:
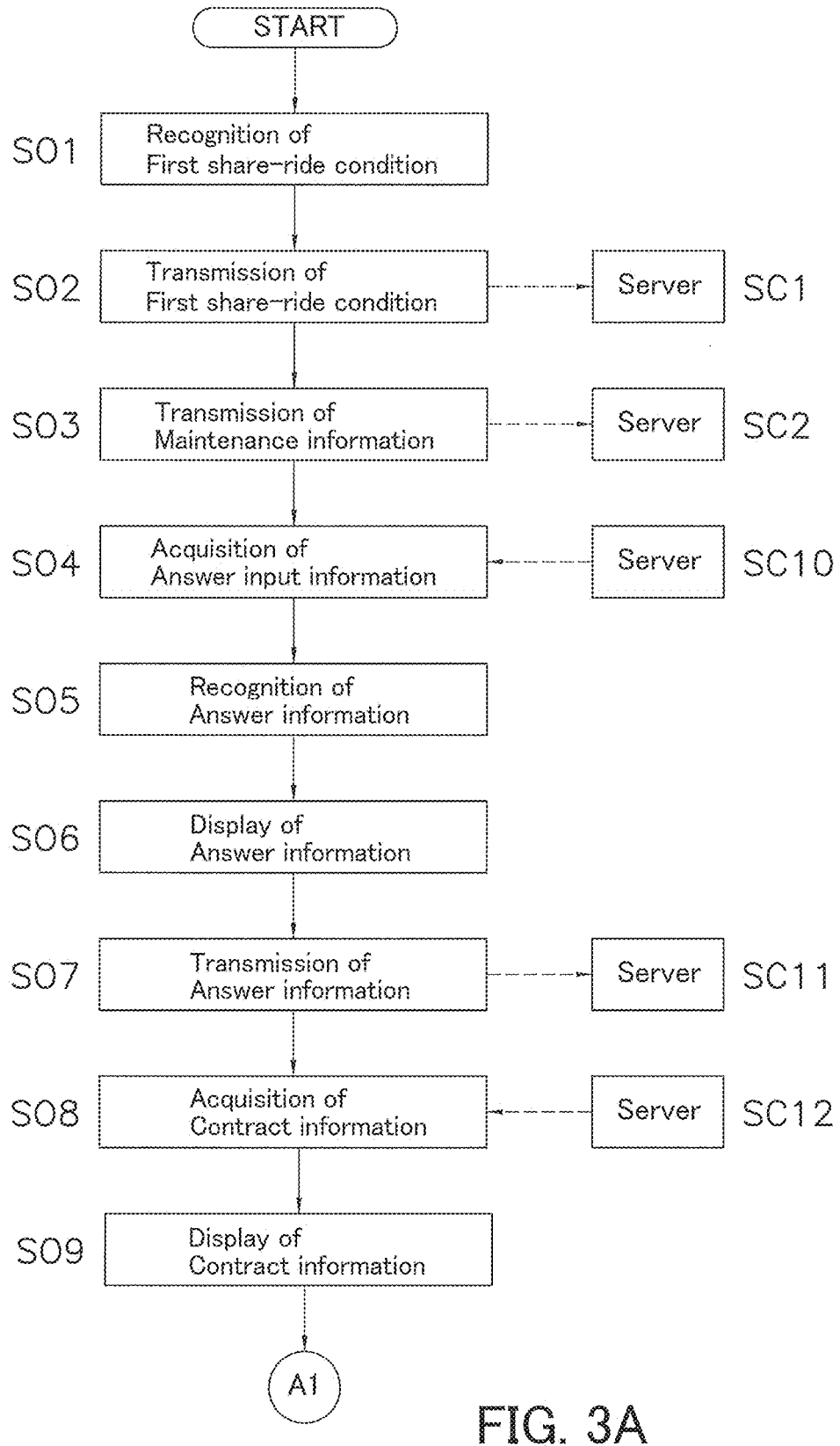
FIG. 3A is a flowchart which shows a process performed on an owner terminal.
Figure 3B:
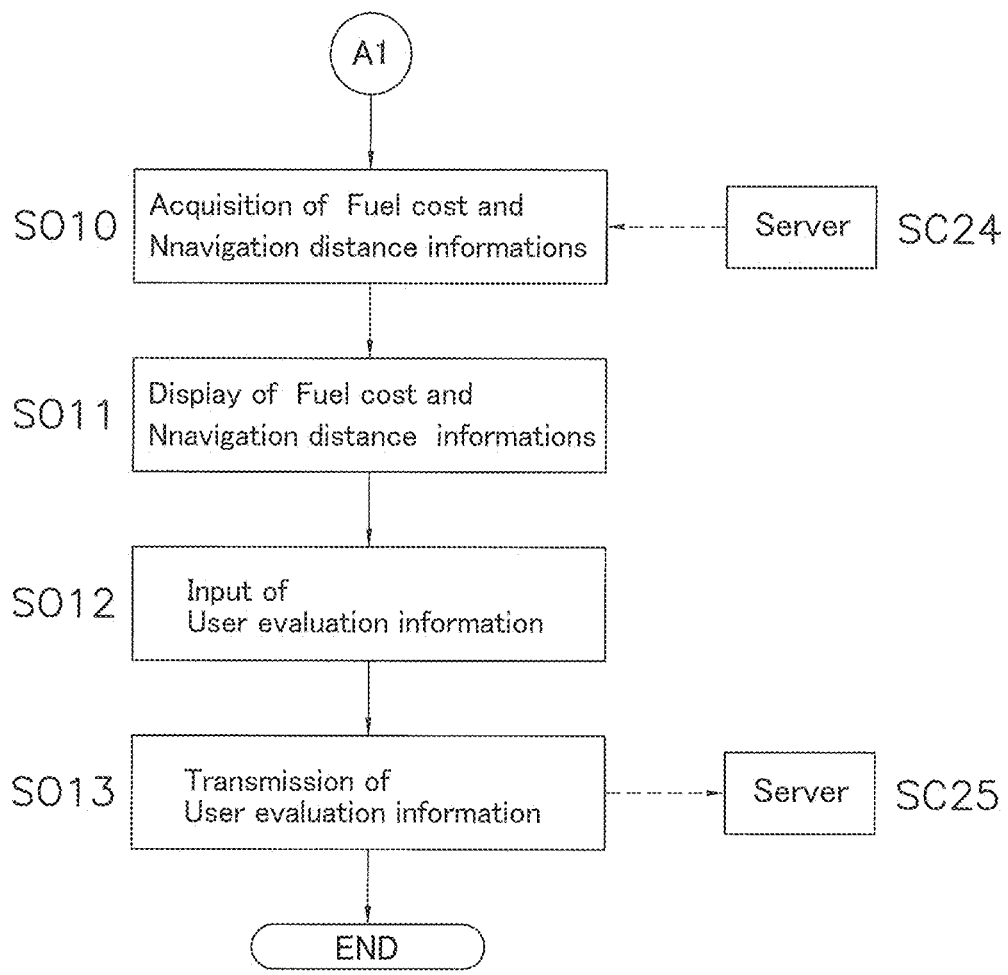
FIG. 3B is an additional flowchart which shows the process performed on the owner terminal.
Figure 4A:
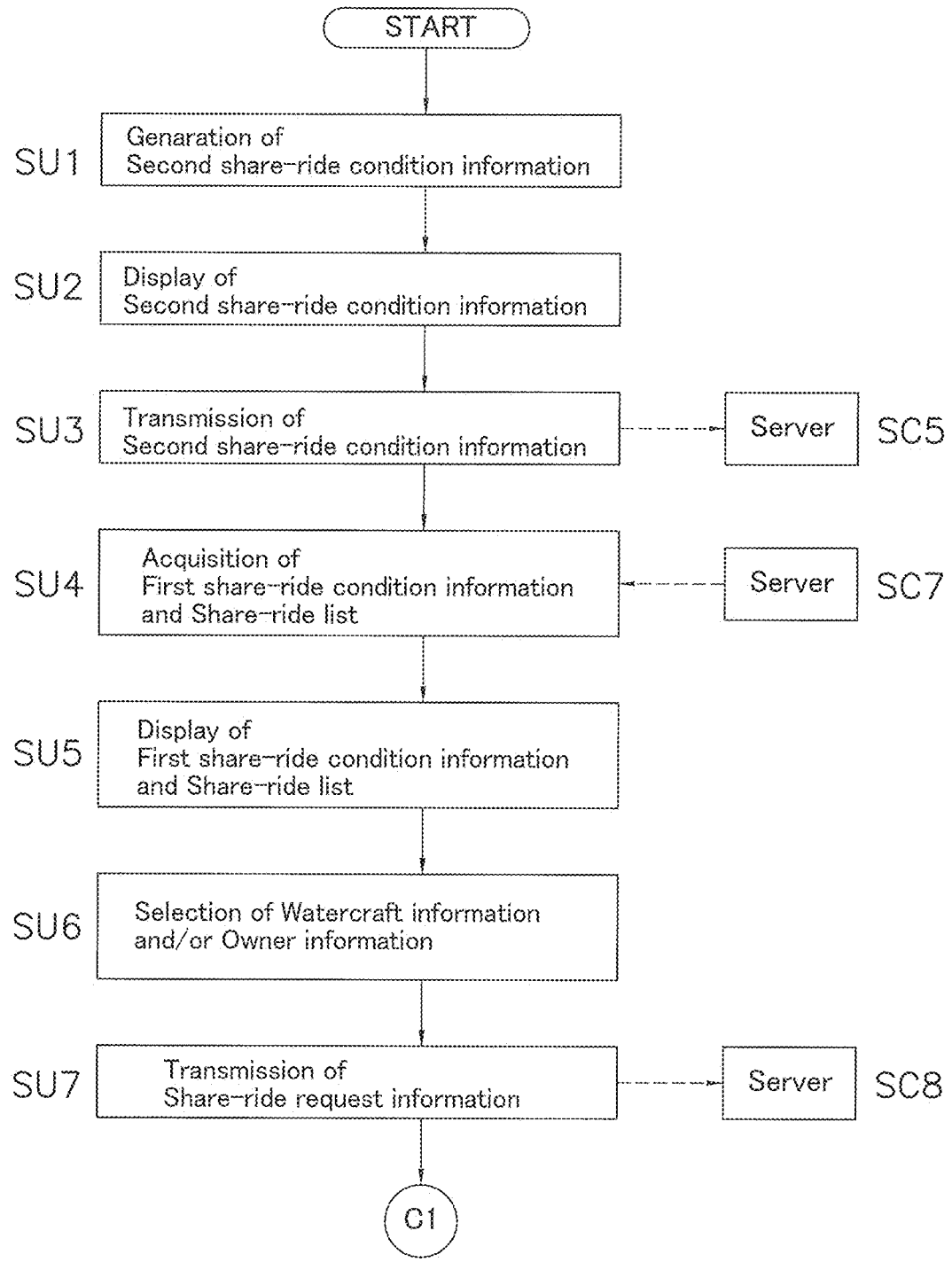
FIG. 4A is a flowchart which shows a process performed on a user terminal.
Figure 4B:
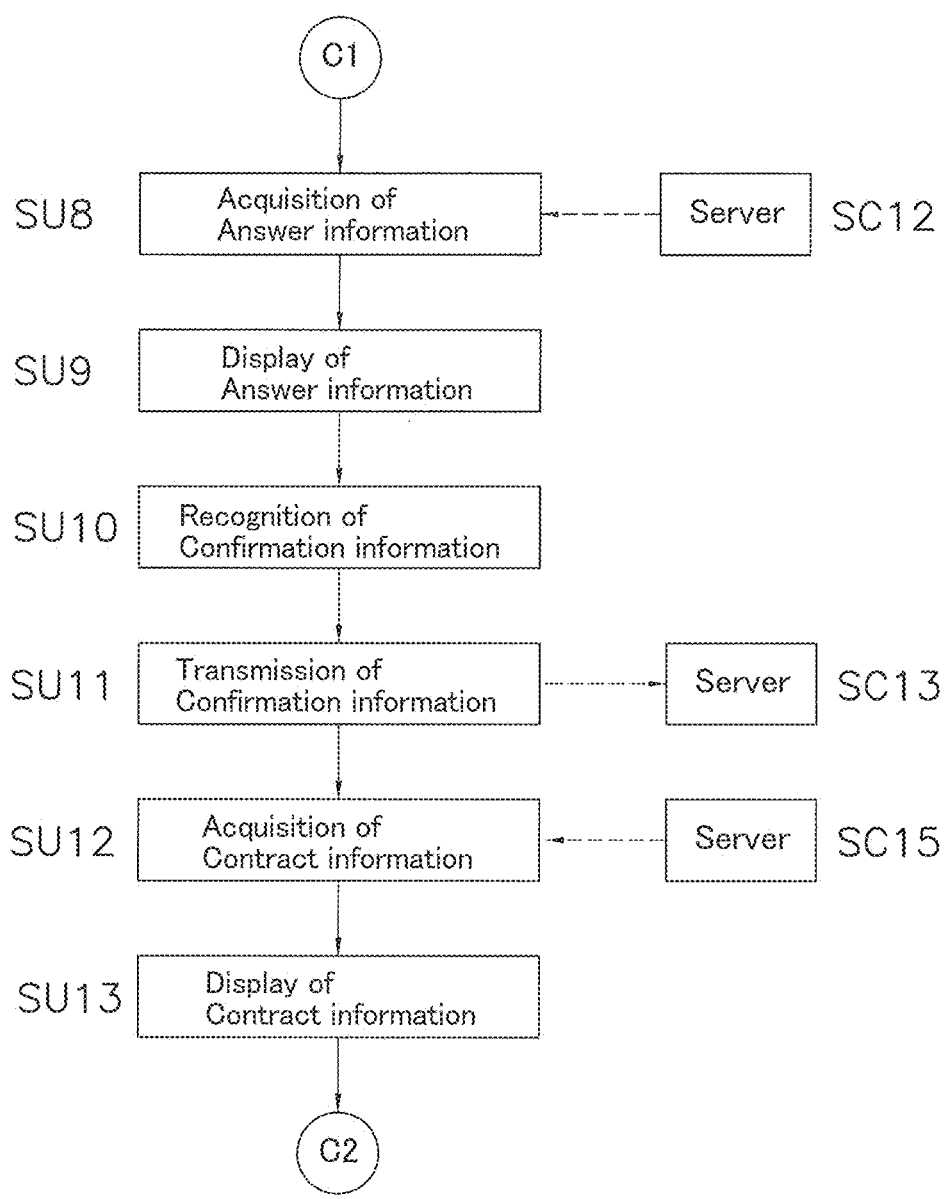
FIG. 4B is an additional flowchart which shows the process performed on the user terminal.
Figure 4C:
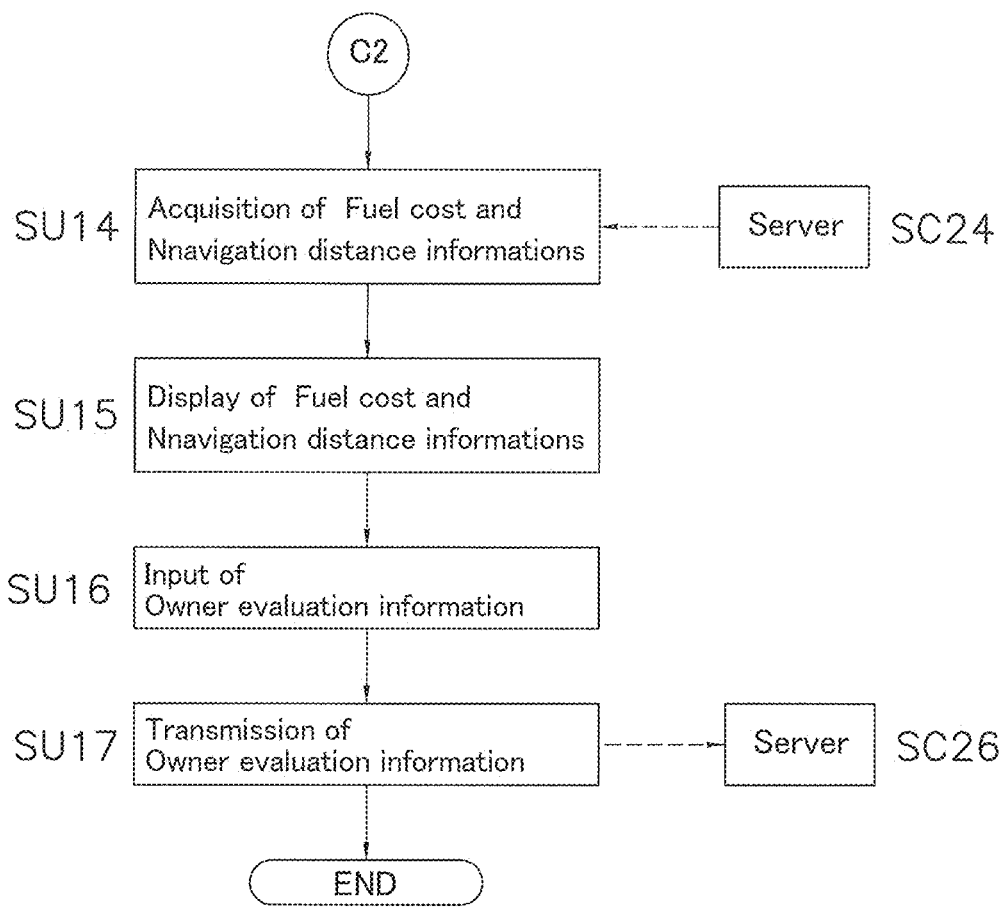
FIG. 4C is an additional flowchart which shows the process performed on the user terminal.
Figure 5:
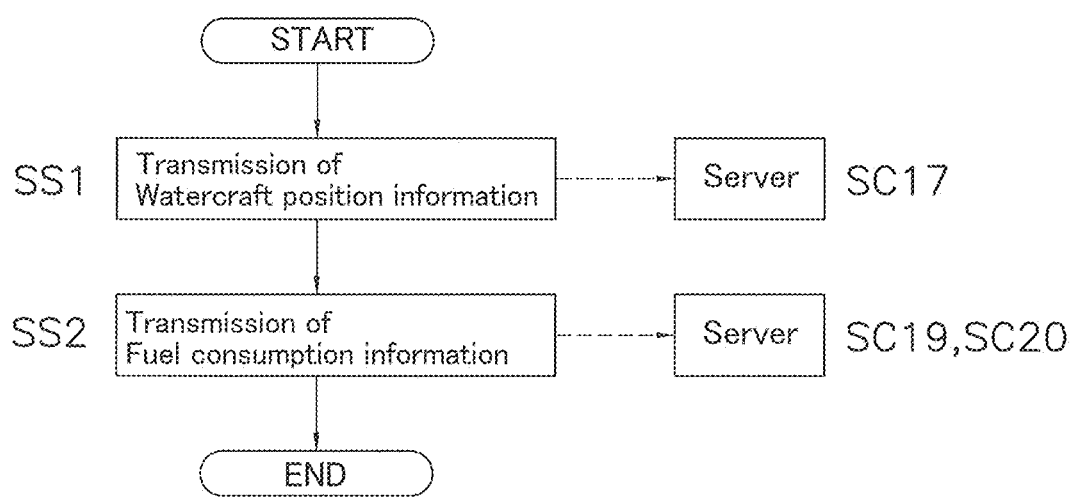
FIG. 5 is a flowchart which shows a process performed on a watercraft.
Figure 6A:
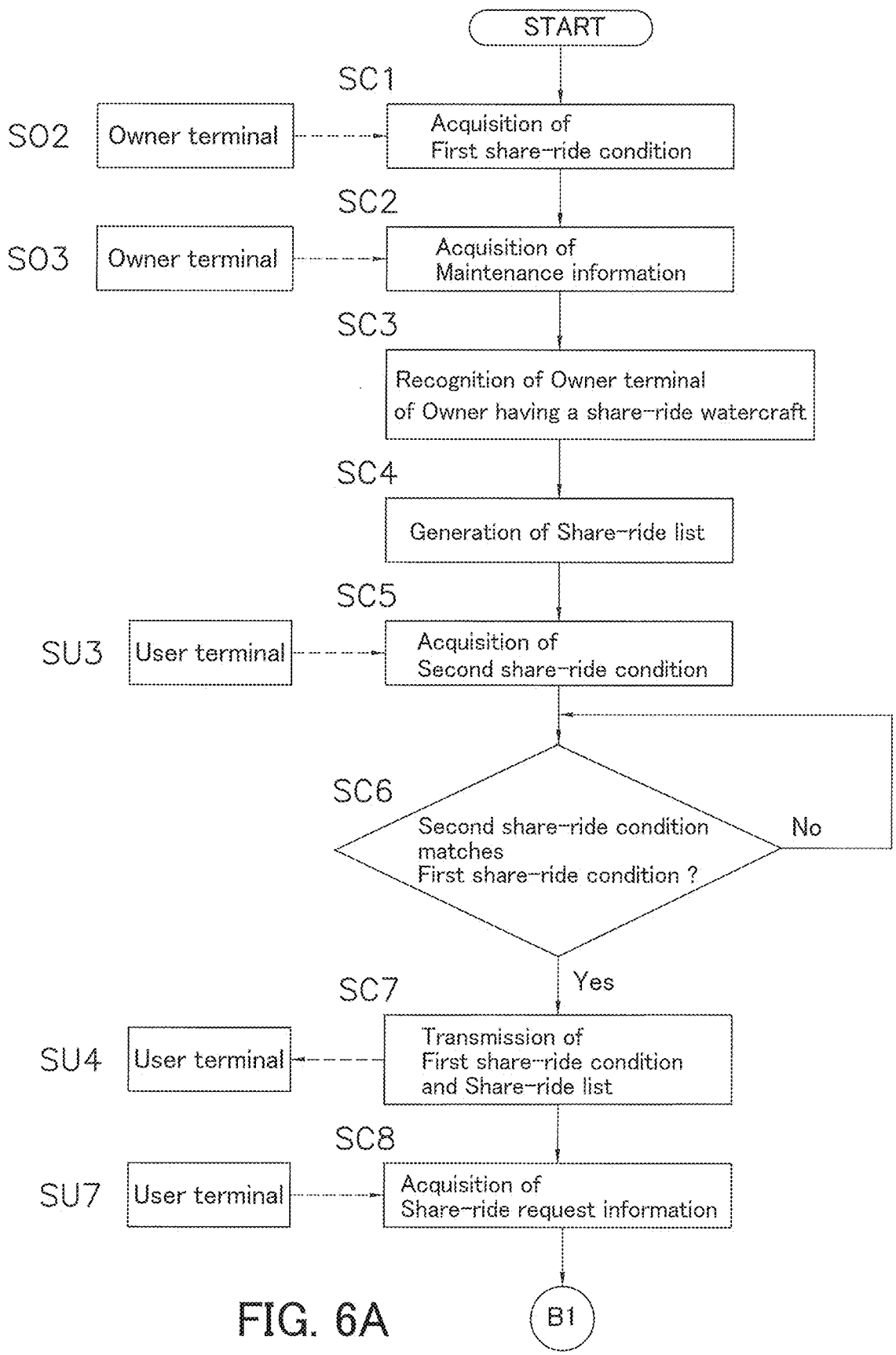
FIG. 6A is a flowchart which shows a process performed on a cloud server.
Figure 6B:
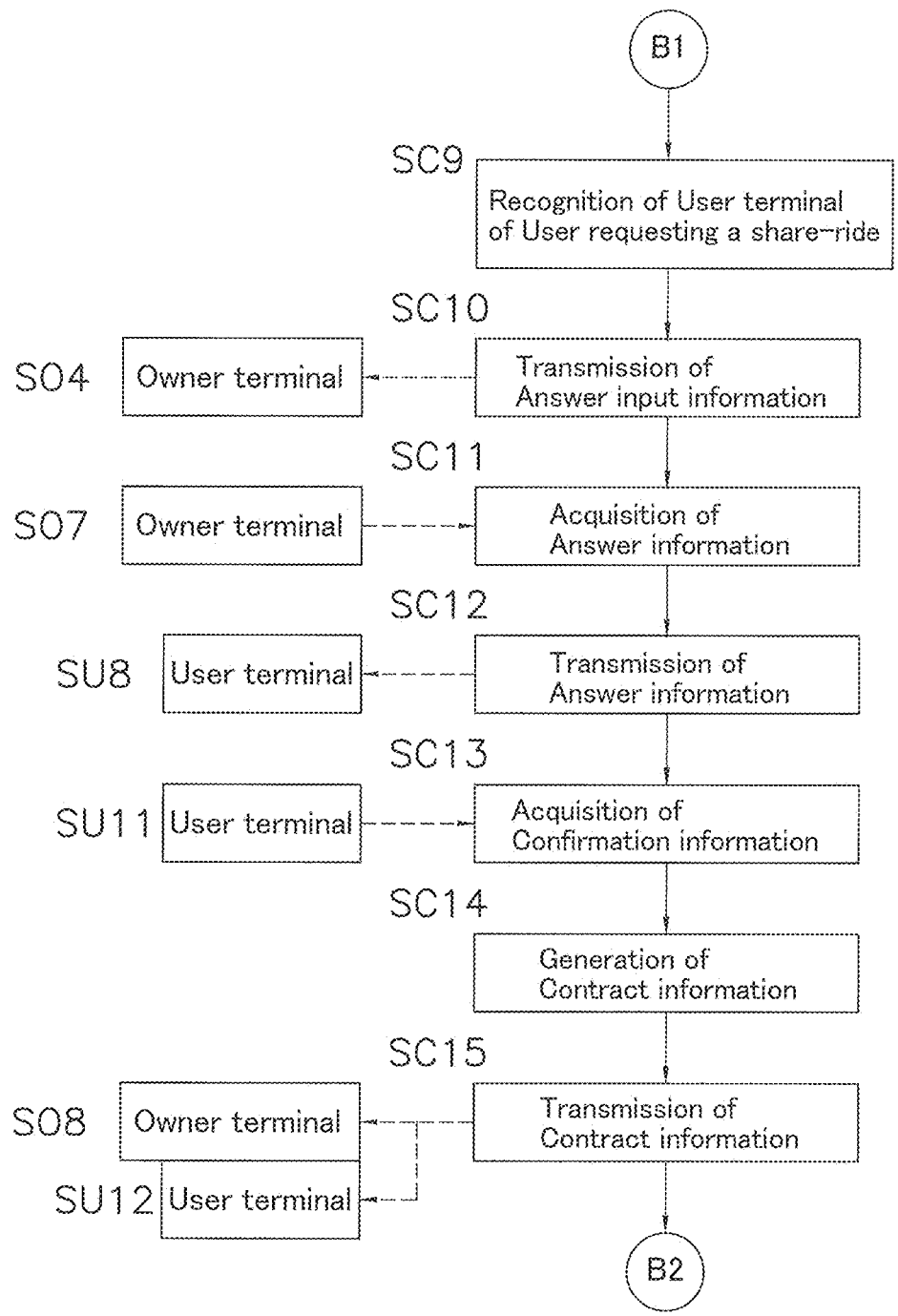
FIG. 6B is an additional flowchart which shows the process performed on the cloud server.
Figure 6C:
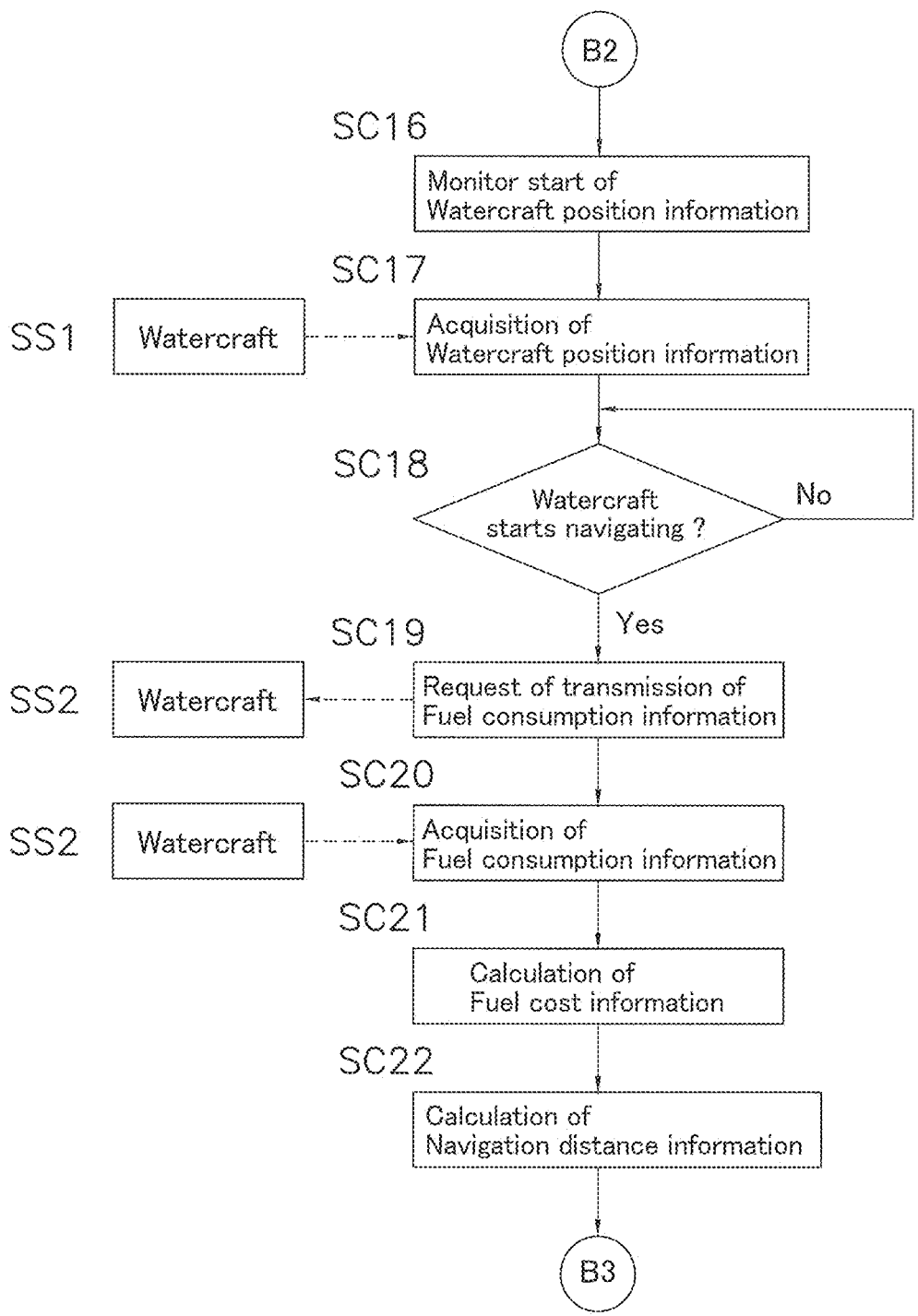
FIG. 6C is an additional flowchart which shows the process performed on the cloud server.
Figure 6D:
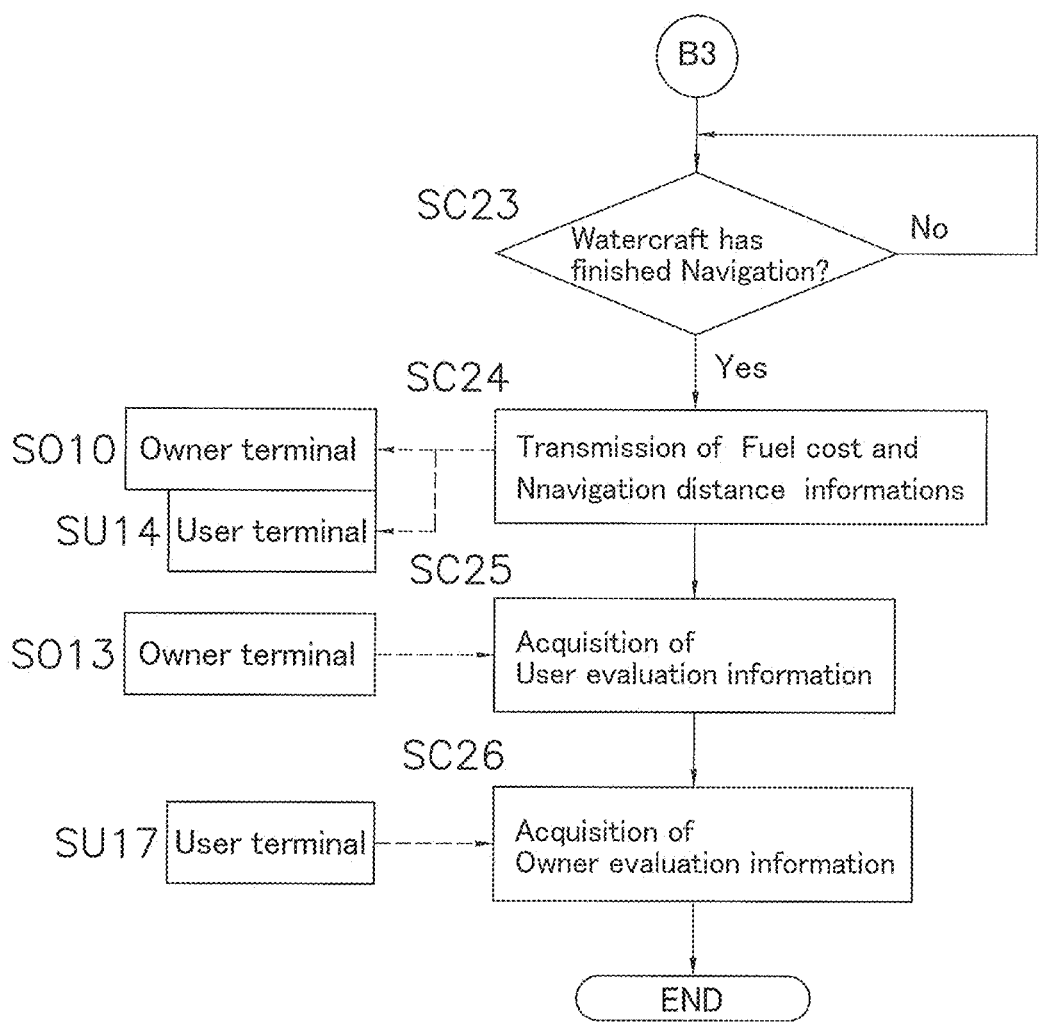
FIG. 6D is an additional flowchart which shows the process performed on the cloud server.

FIGS. 3A and 3B show processing modes of the owner terminal 5 (5a, 5b, 5c). FIGS. 4A to 4C show processing modes of the user terminal 7 (7a, 7b, 7c). FIG. 5 shows a processing mode of the watercraft 9 (9a, 9b, 9c). FIGS. 6A to 6D show processing modes of the cloud server 3.

The first share-ride condition information is input to each of the plurality of owner terminals 5. Thus, each of the plurality of owner terminals 5 recognizes the first share-ride condition information (SO1).

Each owner terminal 5 transmits each first share-ride condition information and each watercraft information to the cloud server 3 (SO2). The cloud server 3 respectively acquires the plurality of first share-ride condition information and the plurality of watercraft information from the plurality of owner terminals 5 (SC1).

Each owner terminal 5 transmits the maintenance information to the cloud server 3 (SO3). The cloud server 3 acquires the plurality of maintenance information from the owner terminal 5 (SC2). The cloud server 3 recognizes the owner terminal 5 of the owner, the owner of the watercraft 9 who is ready to share a ride (SC3).

The cloud server 3 generates the share-ride list based on the first share-ride condition information of the owner terminal 5 of the owner, the owner of the watercraft 9 whose maintenance has been completed (SC4).

The user terminal 7 generates the second share-ride condition information of the user (SU1). The user terminal 7 displays the second share-ride condition information (SU2). The user terminal 7 transmits the second share-ride condition information to the cloud server 3 (SU3).

The cloud server 3 acquires the second share-ride condition information from the user terminal 7 (SC5). The cloud server 3 determines whether or not the second share-ride condition information of the user terminal 7 matches the first share-ride condition information of the owner terminal 5 (SC6).

When the first share-ride condition information and the second share-ride condition information match (Yes in SC6), the cloud server 3 transmits the first share-ride condition information of the owner terminal 5 and the share-ride list to the user terminal 7. The owner terminal 5 is a terminal of the owner of the watercraft 9 whose maintenance has been completed.

On the other hand, when the first share-ride condition information and the second share-ride condition information do not match (No in SC6), the cloud server 3 waits for the second share-ride condition information which matches the first share-ride condition information. In this case, the cloud server 3 does not transmit the first share-ride condition information and the share-ride list to the user terminal 7.

The user terminal 7 acquires the share-ride list and the first share-ride condition information of the owner terminal 5 of the owner of the watercraft 9 whose maintenance has been completed, from the cloud server 3 (SU4). The user terminal 7 displays this first share-ride condition information of the owner terminal 5 and the share-ride list on the display 72 of the user terminal 7 (SU5).

Here, the first share-ride condition information of the owner terminal 5 of the owner, who has the watercraft 9 whose maintenance has been completed, is displayed on the display 72 of the user terminal 7, so as to correspond to each watercraft information and/or each owner information in the share-ride list.

The watercraft information and/or the owner information is selected on the user terminal 7 (SU6). The user terminal 7 transmits the share-ride request information to the cloud server 3 (SU7).

The cloud server 3 acquires the share-ride request information from the user terminal 7 (SC8). The cloud server 3 recognizes the user terminal 7 that transmits the share-ride request information (SC9). The cloud server 3 transmits the answer input information to the owner terminal 5 (SC10).

The owner terminal 5 acquires the answer input information from the cloud server 3 (SO4). The answer information corresponding to the answer input information is input to the owner terminal 5. Thus, the owner terminal 5 recognizes the answer information (SO5). The owner terminal 5 displays the answer information (SO6). The owner terminal 5 transmits the answer information to the cloud server 3 (SO7).

The cloud server 3 acquires the answer information from the owner terminal 5 (SC11). The cloud server 3 transmits the answer information to the user terminal 7 (SC12). The user terminal 7 acquires the answer information from the cloud server 3 (SU8). The user terminal 7 displays the answer information (SU9). The confirmation information corresponding to the answer information is input to the user terminal 7. Thus, the user terminal 7 recognizes the confirmation information (SU10).

The user terminal 7 transmits the confirmation information to the cloud server 3 (SU11). The cloud server 3 acquires the confirmation information from the user terminal 7 (SC13). The cloud server 3 generates the contract information (SC14). The cloud server 3 transmits the contract information to the owner terminal 5 and the user terminal 7 (SC15).

The owner terminal 5 acquires the contract information from the cloud server 3 (SO8). The owner terminal 5 displays the contract information (SO9). The user terminal 7 acquires the contract information from the cloud server 3 (SU12). The user terminal 7 displays the contract information (SU13). Thus, the owner and the user are able to easily understand that the contract has been established or not established.

The cloud server 3 starts monitoring the watercraft position information of the watercraft 9 (SC16). Here, the cloud server 3 requests the transmission of the watercraft position information to the watercraft 9. The watercraft 9 transmits the watercraft position information to the cloud server 3 (SS1).

The cloud server 3 acquires the watercraft position information, for example, the time-series data of watercraft position information from the watercraft 9 (SC17). The cloud server 3 determines whether or not the watercraft 9 has started navigating based on the watercraft position information (SC18).

When the cloud server 3 determines that the watercraft 9 has started navigating (Yes in SC18), the cloud server 3 requests the transmission of the fuel consumption information to the watercraft 9 (SC19). The watercraft 9 transmits the fuel consumption information to the cloud server 3 (SS2).

On the other hand, when the cloud server 3 does not determine that the watercraft 9 has started navigating (No in SC18), the cloud server 3 continues to acquire the watercraft position information of the watercraft 9 and monitors the watercraft position information of the watercraft 9.

The cloud server 3 acquires the fuel consumption information from the watercraft 9 (SC20). The cloud server 3 calculates the fuel cost information based on the fuel consumption information (SC21). The fuel cost information is recorded in the cloud server 3 as time series data. The cloud server 3 calculates the navigation distance information based on the fuel consumption information (SC22). The navigation distance information is recorded in the cloud server 3 as time series data.

The cloud server 3 determines whether or not the watercraft 9 has finished the navigation based on the watercraft position information (SC23). Here, when the cloud server 3 determines that the watercraft 9 has finished the navigation (Yes in SC23), the cloud server 3 transmits the latest fuel cost information and the latest navigation distance information to the owner terminal 5 and the user terminal 7 (SC24).

The owner terminal 5 acquires the latest fuel cost information and the latest navigation distance information from the cloud server 3 (SO10). The owner terminal 5 displays the latest fuel cost information and the latest navigation distance information on the display 52 of the owner terminal 5 (SO11). Thus, the owner is able to easily understand the fuel cost information and the navigation distance information.

The user terminal 7 acquires the latest fuel cost information and the latest navigation distance information from the cloud server 3 (SU14). The user terminal 7 displays the latest fuel cost information and the latest navigation distance information on the display 72 of the user terminal 7 (SU15). Thus, the user is able to easily understand the fuel cost information and the navigation distance information.

The owner terminal 5 inputs user evaluation information indicating the user's evaluation (SO12). The owner terminal 5 transmits the user evaluation information to the cloud server 3 (SO13). The cloud server 3 acquires the user evaluation information from the owner terminal 5 (SC25). The user evaluation information is stored in the cloud server 3. This makes it possible to provide the evaluations of the past users to owners who will use the watercraft share-ride system 1 in the future.

The user terminal 7 inputs owner evaluation information indicating the owner's evaluation (SU16). The user terminal 7 transmits the owner evaluation information to the cloud server 3 (SU17). The cloud server 3 acquires the owner evaluation information from the user terminal 7 (SC26). The owner evaluation information is stored in the cloud server 3. Thus, it is possible to provide the evaluations of the past owners to the user who will use the watercraft share-ride system 1 in the future.

In the above-described watercraft sharing system 1, the users, who share a ride on the plurality of watercrafts 9 (9*a*, 9*b*, 9*c*) managed respectively by the plurality of owners, are invited. Thus, the owner is able to directly invite users who desire to share a ride on the owner's watercraft 9. Also, the owner is able to easily invite the users to share a ride on the owner's watercraft 9.

In the above-described preferred embodiments, the first share-ride condition information may include user selection condition information indicating a condition when the owner selects the user. In this case, the cloud server 3 provides the watercraft information of the owner to the user terminal 7 when the user evaluation information satisfies the user selection condition information.

For example, the user selection condition information is a threshold value for evaluating the user. Specifically, the user selection condition information is the threshold value corresponding to an average evaluation of the users. The user selection condition information may include a threshold value corresponding to the number of the share-rides of the user, the share-ride time of the user, the number of the open sea experiences of the user, the navigation time of the user in the open sea, and the like.

When the user selection condition information (the threshold value) of each owner is input to the shared ride condition input information (the item information) via the input 55 of the owner terminal 5 of each owner, the user selection condition information (the threshold value) of each owner is recognized by the processor 51*a* of the owner terminal 5. This process is performed in step SO1 of the owner terminal 5.

In this way, the first share-ride condition information including the user selection condition information (the threshold value) of each owner is generated. The first share-ride condition information including the user selection condition information (the threshold value) of each owner is provided from the owner terminal 5 to the processor 31*a* of the server 3 and is stored in the memory 31*b* of the server 3. This process is performed in step SO2 of the owner terminal 5.

Here, the average evaluation information corresponding to the average evaluation of the user is set as follows. Each owner evaluates each user after the share-ride is finished (SO12). For example, the evaluation information of each user is recognized by the processor 51*a* of the owner terminal 5 by inputting the evaluation information of each user in the input 55 of each owner terminal 5.

The evaluation information of each user is provided to the processor 31*a* of the server 3 (SO13) and is stored in the memory 31*b* of the server 3 (SC25). The processor 31*a* of the server 3 calculates the average evaluation information of each user by averaging the evaluation information of each user.

For example, the processor 31*a* of the server 3 determines whether or not the user's evaluation information (the user's average evaluation, the user's share-ride number, the user's share-ride time, the number of the open sea experiences of the user, the user's navigation time in the open sea, and the like) satisfies the user selection condition information (the threshold value).

Here, when the user's evaluation information (the user's average evaluation, the user's share-ride number, the user's share-ride time, the number of the open sea experiences of the user, the user's navigation time in the open sea, and the like) satisfies the user selection condition information (the threshold value), the processor 31*a* of the server 3 recognizes the user terminal 7 that satisfies the user selection condition information (the threshold value).

The processor 31*a* of the server 3 provides the user terminal 7 with the first share-ride condition information and the share-ride list (SC7). The first share-ride condition information and the share-ride list are examples of the watercraft information of the owner.

On the other hand, the processor 31*a* of the server 3 does not provide the first share-ride condition information and the share-ride list to the user terminal 7 to the user terminal 7 that does not satisfy the above conditions. By processing in this way, the owner is able to exclude the user with a bad evaluation from a share-ride target.

In the above-described preferred embodiments, the owner terminal 5, the user terminal 7, and the watercraft 9 respectively receive the information from the cloud server 3, and the processor circuitry 51, 71, and 91 respectively perform the processing of the information in the owner terminal 5, the user terminal 7, and the watercraft 9.

Instead of this, the owner terminal 5, the user terminal 7, and the watercraft 9 may directly access the information on the cloud server 3, and the processor circuitry 51, 71, and 91 may perform the processing of the above-described preferred embodiments on the cloud server 3. In this case, for example, the cloud server 3 is used as a data server.

Also, the owner terminal 5, the user terminal 7, and the watercraft 9 may directly access the information on the cloud server 3 and directly input the information on the cloud server 3. In this case, the processor circuitry 31 of the server 3 executes the processing of the above-described preferred embodiments.

According to preferred embodiments of the present invention, it is possible to directly invite a user to share a ride on the owner's watercraft by using the watercraft share-ride system, the computer for a watercraft, and the watercraft share-ride method.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A watercraft share-ride system for inviting a user to share a ride on an owner's watercraft, the watercraft share-ride system comprising:
    a computer;
    an owner terminal to provide watercraft information of an owner and first share-ride condition information of the owner to the computer, the watercraft information including watercraft-body information, engine information, and equipment information;
    a user terminal to provide second share-ride condition information of the user to the computer; and
    a watercraft including a communicator to communicate with the computer; wherein
    the computer is configured or programmed to:
        provide the watercraft information to the user terminal when the first share-ride condition information and the second share-ride condition information match; and
        acquire share-ride request information corresponding to the watercraft information that is used as data for the user terminal to request a share-ride when the watercraft information is selected by the user terminal.

2. The watercraft share-ride system according to claim 1, wherein
    the first share-ride condition information includes first purpose information indicating a navigation purpose of the owner; and
    the second share-ride condition information includes second purpose information indicating a navigation purpose of the user.

3. The watercraft share-ride system according to claim 1, further comprising:
    a fuel information acquirer to acquire fuel consumption information during navigation of the watercraft; wherein
    the computer is configured or programmed to calculate a fuel cost during navigation of the watercraft based on the fuel consumption information acquired from the communicator.

4. The watercraft share-ride system according to claim 3, further comprising:
    a fuel detector to detect a fuel injection amount injected from an engine during navigation of the watercraft; wherein
    the fuel information acquirer acquires the fuel injection amount as the fuel consumption information from the fuel detector; and
    the computer is configured or programmed to calculate the fuel cost based on the fuel injection amount.

5. The watercraft share-ride system according to claim 3, further comprising:
    a watercraft position detector to detect watercraft position information of the watercraft and provide the watercraft position information to the computer; wherein
    the computer is configured or programmed to determine whether or not the watercraft starts navigating based on the watercraft position information and to calculate the fuel cost when the watercraft starts navigating.

6. The watercraft share-ride system according to claim 1, further comprising:
    a maintenance information providing terminal to provide maintenance information indicating an end of maintenance of the watercraft to the computer; wherein
    the computer is configured or programmed to determine whether or not the first share-ride condition information and the second share-ride condition information match when the computer acquires the maintenance information.

7. The watercraft share-ride system according to claim 1, wherein
    the owner terminal is configured or programmed to provide the computer with user evaluation information indicating an evaluation of the user;
    the user terminal is configured or programmed to provide the computer with owner evaluation information indicating an evaluation of the owner; and
    the computer is configured or programmed to record the user evaluation information and the owner evaluation information.

8. The watercraft share-ride system according to claim 7, wherein
    the first share-ride condition information includes user selection condition information indicating a condition when the owner selects the user; and
    the computer is configured or programmed to provide the watercraft information of the owner to the user terminal when the user evaluation information satisfies the user selection condition information.

9. A computer for a watercraft used to invite a user to share a ride on an owner's watercraft, the computer comprising:
    an information receiver to acquire watercraft information of an owner and first share-ride condition information of the owner from an owner terminal and second share-ride condition information of the user from a user terminal, the watercraft information including watercraft-body information, engine information, and equipment information;
    an information provider to provide the watercraft information, the first share-ride condition information, and the second share-ride condition information to the owner terminal and the user terminal; and
    processor circuitry to process the watercraft information, the first share-ride condition information, and the second share-ride condition information acquired by the information receiver, the processor circuitry being configured or programmed to:

provide the watercraft information to the user terminal when the first share-ride condition information acquired from the owner terminal by the information receiver and the second share-ride condition information acquired from the user terminal by the information receiver match; and acquire share-ride request information that is used as data for the user terminal to request a user's share-ride to the owner when the watercraft information is selected by the user terminal.

10. The computer according to claim 9, wherein
the first share-ride condition information includes first purpose information indicating a navigation purpose of the owner; and
the second share-ride condition information includes second purpose information indicating a navigation purpose of the user.

11. The computer according to claim 9, wherein
the information receiver is configured or programmed to acquire fuel consumption information, which is acquired by a fuel information acquirer of the watercraft, from a communicator of the watercraft; and
the processor circuitry is configured or programmed to calculate a fuel cost during navigation of the watercraft based on the fuel consumption information.

12. The computer according to claim 11, wherein
the information receiver is configured or programmed to acquire a fuel injection amount during navigation of the watercraft, which is detected by a fuel detector of the watercraft, from the communicator; and
the processor circuitry is configured or programmed to calculate the fuel cost based on the fuel injection amount.

13. The computer according to claim 11, wherein
the information receiver is configured or programmed to acquire watercraft position information, which is detected by a watercraft position detector of the watercraft, from the communicator of the watercraft; and
the processor circuitry is configured or programmed to determine whether or not the watercraft starts navigating based on the watercraft position information and to calculate the fuel cost when the watercraft starts navigating.

14. The computer according to claim 9, wherein
the information receiver is configured or programmed to acquire maintenance information, which indicates an end of a maintenance of the watercraft, from a maintenance information providing terminal; and
the processor circuitry is configured or programmed to determine whether or not the first share-ride condition information and the second share-ride condition information match when the processor circuitry acquires the maintenance information.

15. The computer according to claim 9, wherein the information receiver is configured or programmed to:
acquire user evaluation information, which indicates an evaluation of the user, from the owner terminal; and
acquire owner evaluation information, which indicates an evaluation of the owner, from the user terminal.

16. The computer according to claim 15, wherein
the first share-ride condition information includes user selection condition information indicating a condition when the owner selects the user; and
the processor circuitry is configured or programmed to provide the watercraft information of the owner to the user terminal when the user evaluation information satisfies the user selection condition information.

17. A watercraft share-ride method performed by a computer to invite a user to share a ride on an owner's watercraft, the method comprising:
providing watercraft information of an owner to a user terminal when first share-ride condition information acquired from an owner terminal and second share-ride condition information acquired from the user terminal match, the watercraft information including watercraft-body information, engine information, and equipment information;
providing the watercraft information, the first share-ride condition information, and the second share-ride condition information to the owner terminal and the user terminal; and
acquiring share-ride request information that is used as data for the user terminal to request a user's share-ride to the owner when the watercraft information is selected by the user terminal.

18. A watercraft share-ride system for inviting a user to share a ride on an owner's watercraft, the watercraft share-ride system comprising:
a computer;
an owner terminal to provide watercraft information of an owner and first share-ride condition information of the owner to the computer;
a user terminal to provide second share-ride condition information of the user to the computer;
a watercraft including a communicator to communicate with the computer; and
a fuel information acquirer to acquire fuel consumption information during navigation of the watercraft; wherein
the computer is configured or programmed to:
provide the watercraft information to the user terminal when the first share-ride condition information and the second share-ride condition information match;
acquire share-ride request information corresponding to the watercraft information when the watercraft information is selected by the user terminal; and
calculate a fuel cost during navigation of the watercraft based on the fuel consumption information acquired from the communicator.

19. A computer for a watercraft used to invite a user to share a ride on an owner's watercraft, the computer comprising:
an information receiver to acquire watercraft information of an owner and first share-ride condition information of the owner from an owner terminal and second share-ride condition information of the user from a user terminal;
an information provider to provide the watercraft information, the first share-ride condition information, and the second share-ride condition information to the owner terminal and the user terminal; and
processor circuitry to process the watercraft information, the first share-ride condition information, and the second share-ride condition information acquired by the information receiver, the processor circuitry being configured or programmed to:
provide the watercraft information to the user terminal when the first share-ride condition information acquired from the owner terminal by the information receiver and the second share-ride condition information acquired from the user terminal by the information receiver match; and acquire share-ride request information to request a user's share-ride to the owner when the watercraft information is selected by the user terminal;

the information receiver is configured or programmed to acquire fuel consumption information, which is acquired by a fuel information acquirer of the watercraft, from a communicator of the watercraft; and the processor circuitry is configured or programmed to calculate a fuel cost during navigation of the watercraft based on the fuel consumption information.

20. A watercraft share-ride system for inviting a user to share a ride on an owner's watercraft, the watercraft share-ride system comprising:

a computer;

an owner terminal to provide watercraft information of an owner and first share-ride condition information of the owner to the computer;

a user terminal to provide second share-ride condition information of the user to the computer;

a watercraft including a communicator to communicate with the computer; and a maintenance information providing terminal to provide maintenance information indicating an end of maintenance of the watercraft to the computer, the maintenance information including fuel calibration and confirmation of fuel replenishment status; wherein the computer is configured or programmed to:

provide the watercraft information to the user terminal when the first share-ride condition information and the second share-ride condition information match;

acquire share-ride request information corresponding to the watercraft information when the watercraft information is selected by the user terminal; and determine whether or not the first share-ride condition information and the second share-ride condition information match when the computer acquires the maintenance information.

21. A computer for a watercraft used to invite a user to share a ride on an owner's watercraft, the computer comprising:

an information receiver to acquire watercraft information of an owner and first share-ride condition information of the owner from an owner terminal and second share-ride condition information of the user from a user terminal;

an information provider to provide the watercraft information, the first share-ride condition information, and the second share-ride condition information to the owner terminal and the user terminal; and processor circuitry to process the watercraft information, the first share-ride condition information, and the second share-ride condition information acquired by the information receiver, the processor circuitry being configured or programmed to:

provide the watercraft information to the user terminal when the first share-ride condition information acquired from the owner terminal by the information receiver and the second share-ride condition information acquired from the user terminal by the information receiver match; and acquire share-ride request information to request a user's share-ride to the owner when the watercraft information is selected by the user terminal;

the information receiver is configured or programmed to acquire maintenance information, which indicates an end of a maintenance of the watercraft, from a maintenance information providing terminal; and the processor circuitry is configured or programmed to determine whether or not the first share-ride condition information and the second share-ride condition information match when the processor circuitry acquires the maintenance information.

* * * * *